(12) United States Patent
Madoukh

(10) Patent No.: US 6,594,763 B1
(45) Date of Patent: Jul. 15, 2003

(54) OBJECT-BASED SECURITY SYSTEM

(75) Inventor: Ashraf T. Madoukh, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 106 days.

(21) Appl. No.: 09/963,158

(22) Filed: Sep. 25, 2001

Related U.S. Application Data

(63) Continuation of application No. 09/179,477, filed on Oct. 27, 1998, now Pat. No. 6,330,677.

(51) Int. Cl.$^7$ ................................ H04L 9/00
(52) U.S. Cl. .................. 713/200; 713/201; 713/166
(58) Field of Search ................ 713/200, 201, 713/202, 155, 151, 168, 156; 709/229, 328; 380/251, 255, 277, 287

(56) References Cited

U.S. PATENT DOCUMENTS

| | | | | |
|---|---|---|---|---|
| 5,774,879 A | * | 6/1998 | Custy et al. | 705/35 |
| 5,898,781 A | * | 4/1999 | Shanton | 713/166 |
| 6,088,796 A | * | 7/2000 | Cianfrocca et al. | 713/152 |
| 6,330,677 B1 | * | 12/2001 | Madoukh | 713/200 |

* cited by examiner

Primary Examiner—Ly V. Hua
(74) Attorney, Agent, or Firm—Harley R. Ball; Steven J. Funk; Kevin D. Robb

(57) ABSTRACT

The invention authenticates processes and inter-process messaging. In some examples of the invention, security is performed in three layers—the application layer, the middleware layer, and the transport layer. Some examples of the invention include software products. One software product comprises security software and middleware software stored on a software storage medium. The security software directs a processor to receive a log-in request for a process, generate a request to authenticate the process, transfer the request to authenticate the process, receive a security association for the process, and transfer the security association. The middleware software directs the processor to receive the security association from the security software, receive a message from the process, insert the security association into the message, and transfer the message. Another software product comprises security software stored on a software storage medium. The security software directs a processor to receive a request to authenticate a process, authenticate the process, generate a security association for the process, store the security association, transfer the security association, receive the security association extracted from a message, and check the security association extracted from the message with the stored security association to authenticate the message.

38 Claims, 25 Drawing Sheets

OBJECT-BASED SECURITY SYSTEM

RELATED APPLICATIONS

This application is a continuation of prior application Ser. No. 09/179,477, filed on Oct. 27, 1998, now issued as U.S. Pat. No. 6,330,677, and that is herein incorporated by reference into this application.

BACKGROUND OF THE INVENTION

1. Field of the Invention

The invention is related to the field of security systems, and in particular, to an object-based security system for computing and communications systems.

2. Statement of the Problem

Computer and communication system security has become of paramount importance with the increase in the use of such systems across all aspects of industry. Numerous security tools are available for these systems, but unfortunately, the current tools exhibit numerous shortcomings.

Current security products are designed to work as a single integrated package with their own feature set. If an improved security feature is made available in a different product, then the user must wait for their product to include the new feature or buy the other product. There is a need for security products to be abstracted behind a client interface so security features can be upgraded without replacing the security system.

Current security products are also difficult for application programmers to design to. For example, the programmer designing communications software for a personal computer must understand all of the messaging and interaction required to interface with the security product. There is a need for security products that offer simple interfaces to application software developers.

Current security products typically apply security at a single communications layer. There is a need for security tools that apply security at multiple layers of inter-processor communications.

SUMMARY OF THE INVENTION

The invention solves the above problems with methods and software products that authenticate processes and inter-process messaging in computer or communications systems. Some examples of the invention operate as follows in an environment comprised of a first computer system, a second computer system, and a security system. In the first computer system, a process transfers a log-in request to a security object. The security object transfers a request to authenticate the process to the security system. The security system authenticates the process and generates a security association. In some versions of the invention, the security association is a random number. The security system stores the security association and transfers the security association to the security object in the first computer system.

In the first computer system, the security object transfers the security association to the middleware. The middleware subsequently receives a message from the process for transfer to the second computer system. The middleware inserts the security association into the message and transfers the message to the middleware in the second computer system.

In some examples of the invention, the security object in the first computer system transfers the security association to a transport layer in the first computer system. The transport layer receives the message from the middleware in the first computer system for transfer to the second computer system. The transport layer inserts the security association into the message and transfers the message to the transport layer in the second computer system. In the second computer system, the transport layer extracts the security association from the message and transfers the security association to the security system. The security system checks the security association extracted from the message with the stored security association to authenticate the message.

Some examples of the invention include software products. One software product comprises security software and middleware software stored on a software storage medium. The security software directs a processor to receive a log-in request for a process, generate a request to authenticate the process, transfer the request to authenticate the process, receive a security association for the process, and transfer the security association. The middleware software directs the processor to receive the security association from the security software, receive a message from the process, insert the security association into the message, and transfer the message.

Another software product comprises security software stored on a software storage medium. The security software directs a processor to receive a request to authenticate a process, authenticate the process, generate a security association for the process, store the security association, transfer the security association, receive the security association extracted from a message, and check the security association extracted from the message with the stored security association to authenticate the message.

The invention authenticates processes and inter-process messaging. The processes could be in an end-user's computer to provide access to a network. The processes could also be in a network system without any end-user. In some examples of the invention, security is performed in three layers—the application layer, the middleware layer, and the transport layer. The three layers of security provide a highly secure environment.

One advantage of the security system is the ease with which processes can be developed and installed for use within a highly secured environment. The programmer need only design their process to provide a password to a local security object. The use of middleware provides an easy message interface to the programmer for this purpose. The security objects and middleware then handle the authentication of both the process and messages sent and received by the process. System users and devices only need the relatively thin client security objects, middleware, and transport software to operate in a highly secured environment.

The local security objects also provide a thin client interface to a robust security toolkit. The security features are abstracted behind the client interface and can be conveniently updated for a user without changing out the user's security system. Thus, the user is provided a true choice of advanced in security technologies.

DETAILED DESCRIPTION OF THE INVENTION

General Configuration and Operation—FIGS. 1–10

Figure 1:
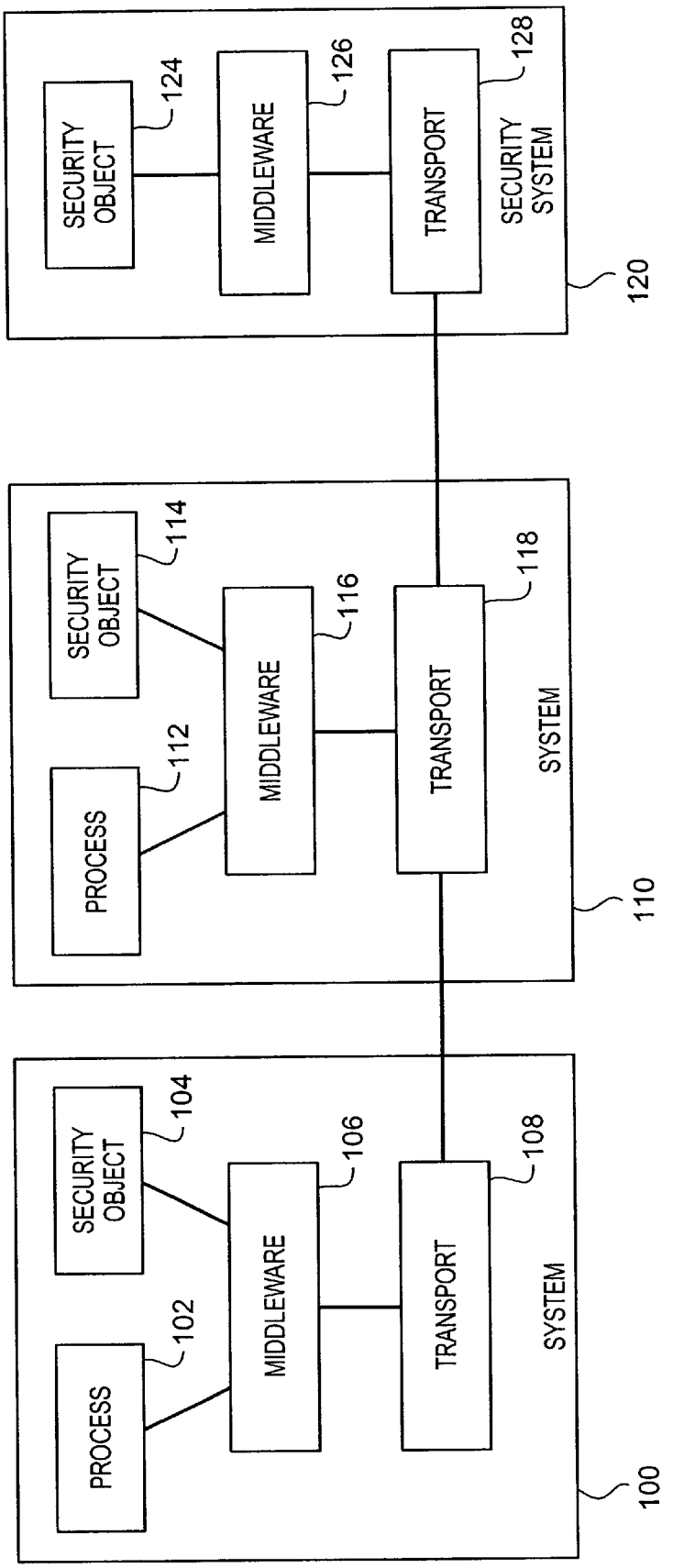
FIG. 1 is system-level block diagram of an example of the invention.
Figure 2:
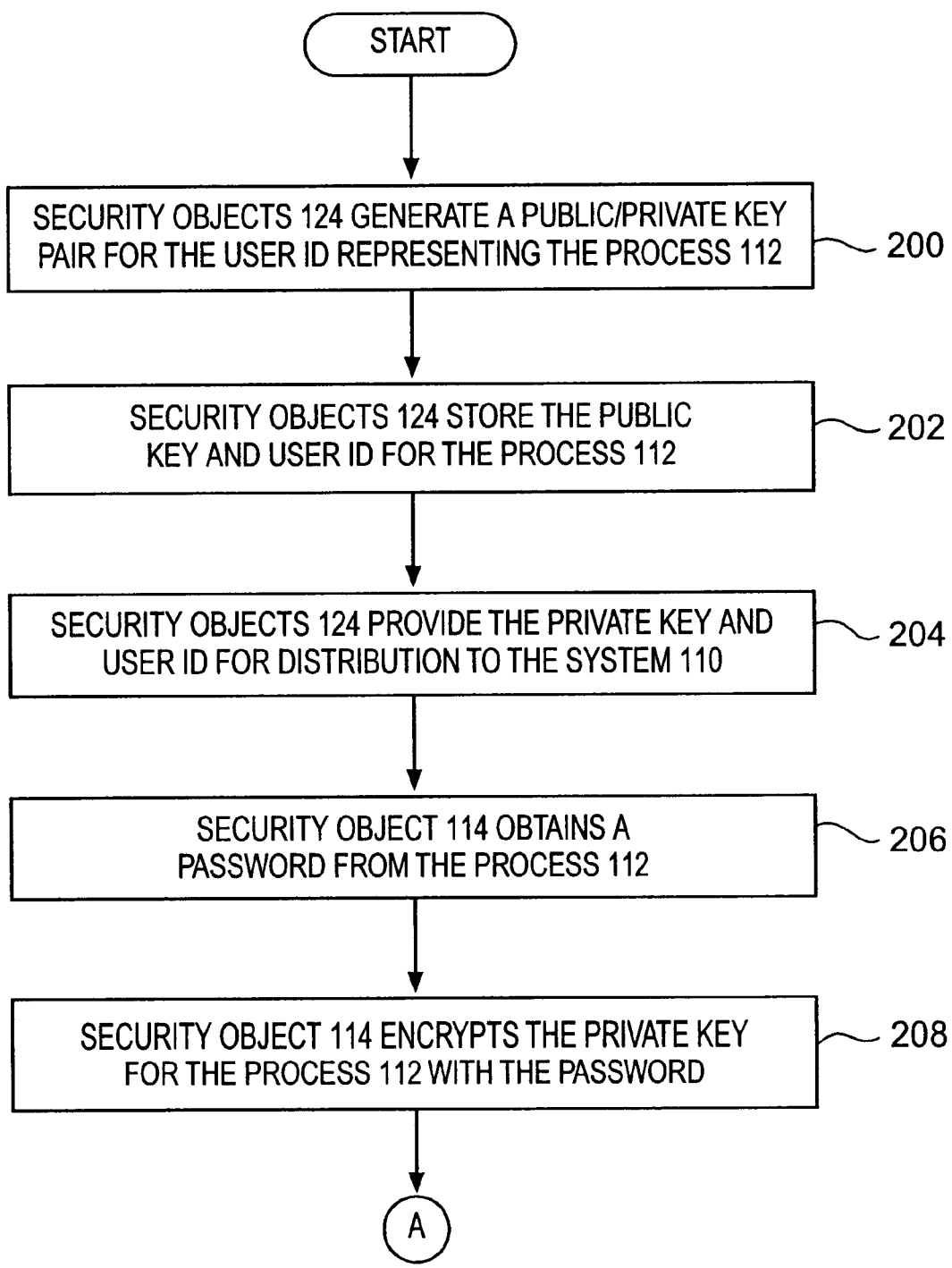
FIG. 2 is a flow diagram of system operation in an example of the invention.
Figure 3:
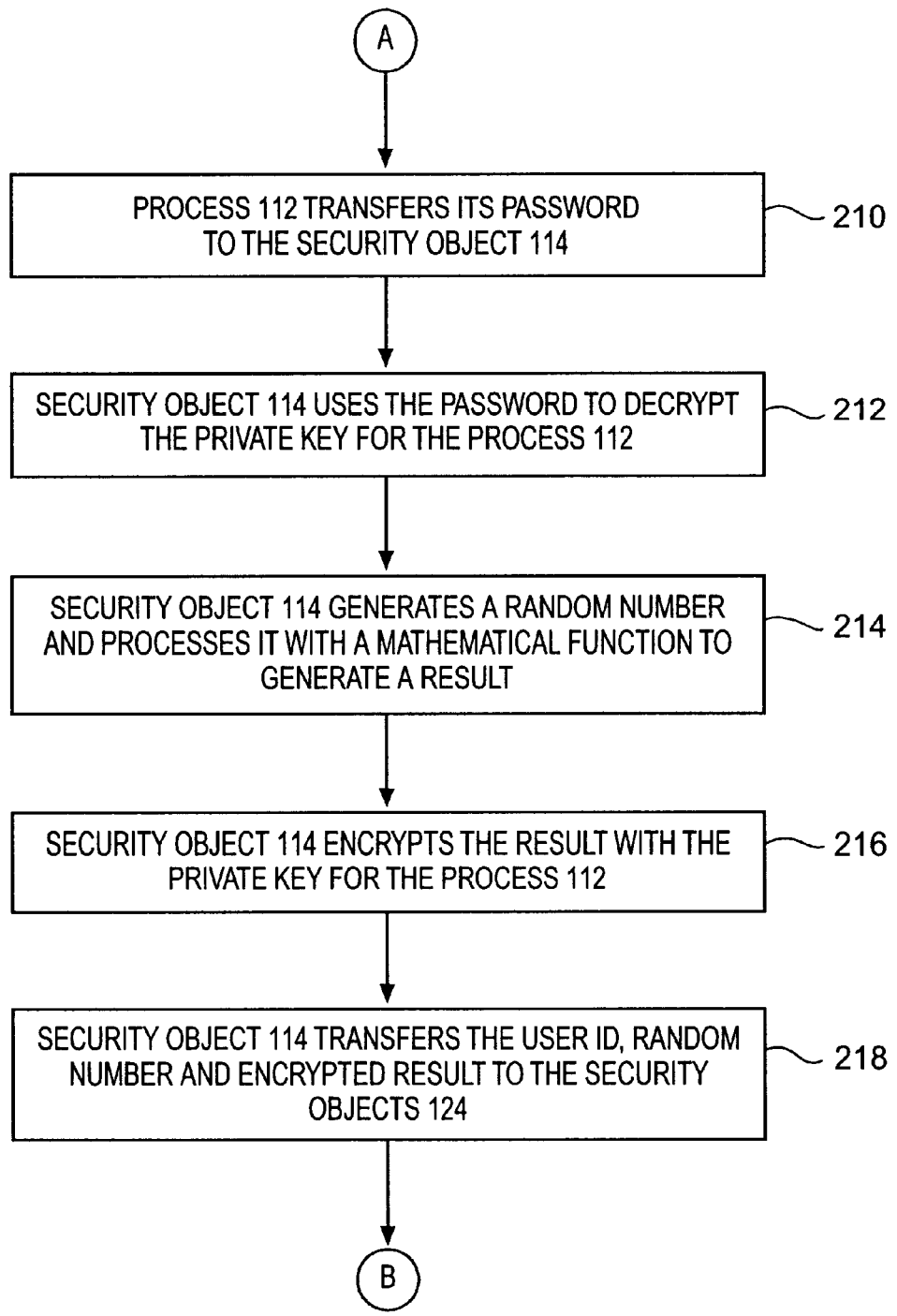
FIG. 3 is a flow diagram of system operation in an example of the invention.
Figure 4:
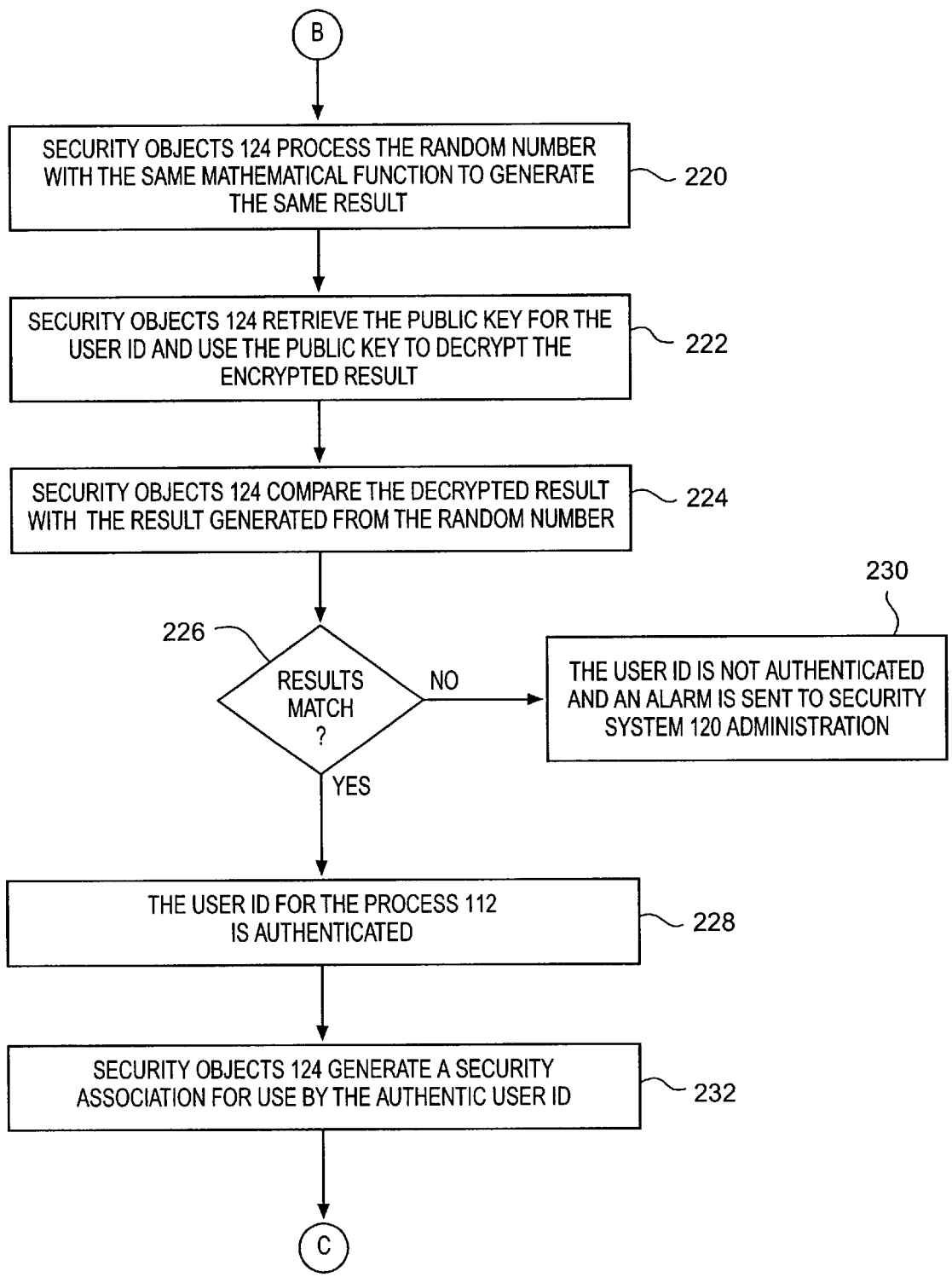
FIG. 4 is a flow diagram of system operation in an example of the invention.
Figure 5:
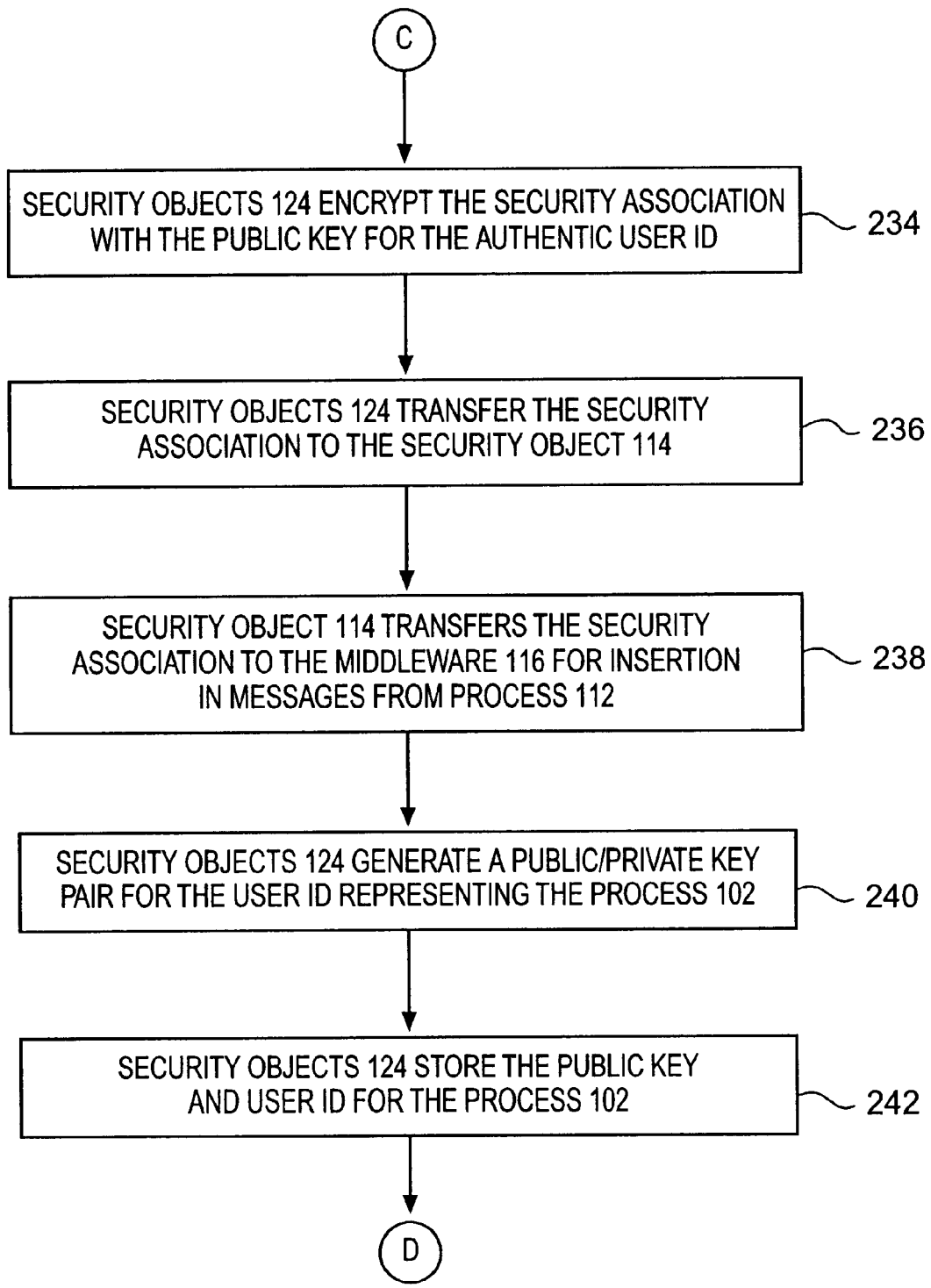
FIG. 5 is a flow diagram of system operation in an example of the invention.
Figure 6:
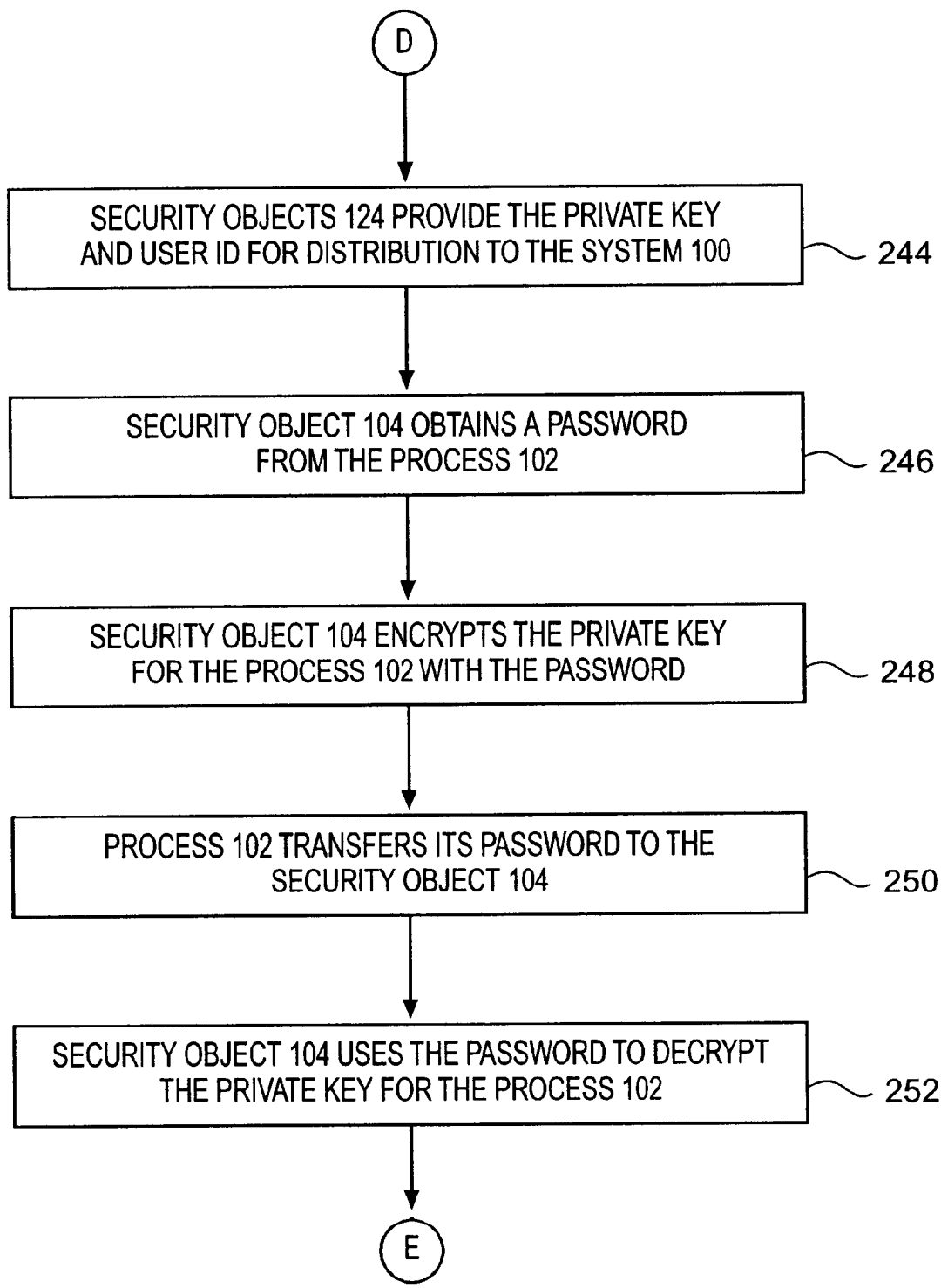
FIG. 6 is a flow diagram of system operation in an example of the invention.
Figure 7:
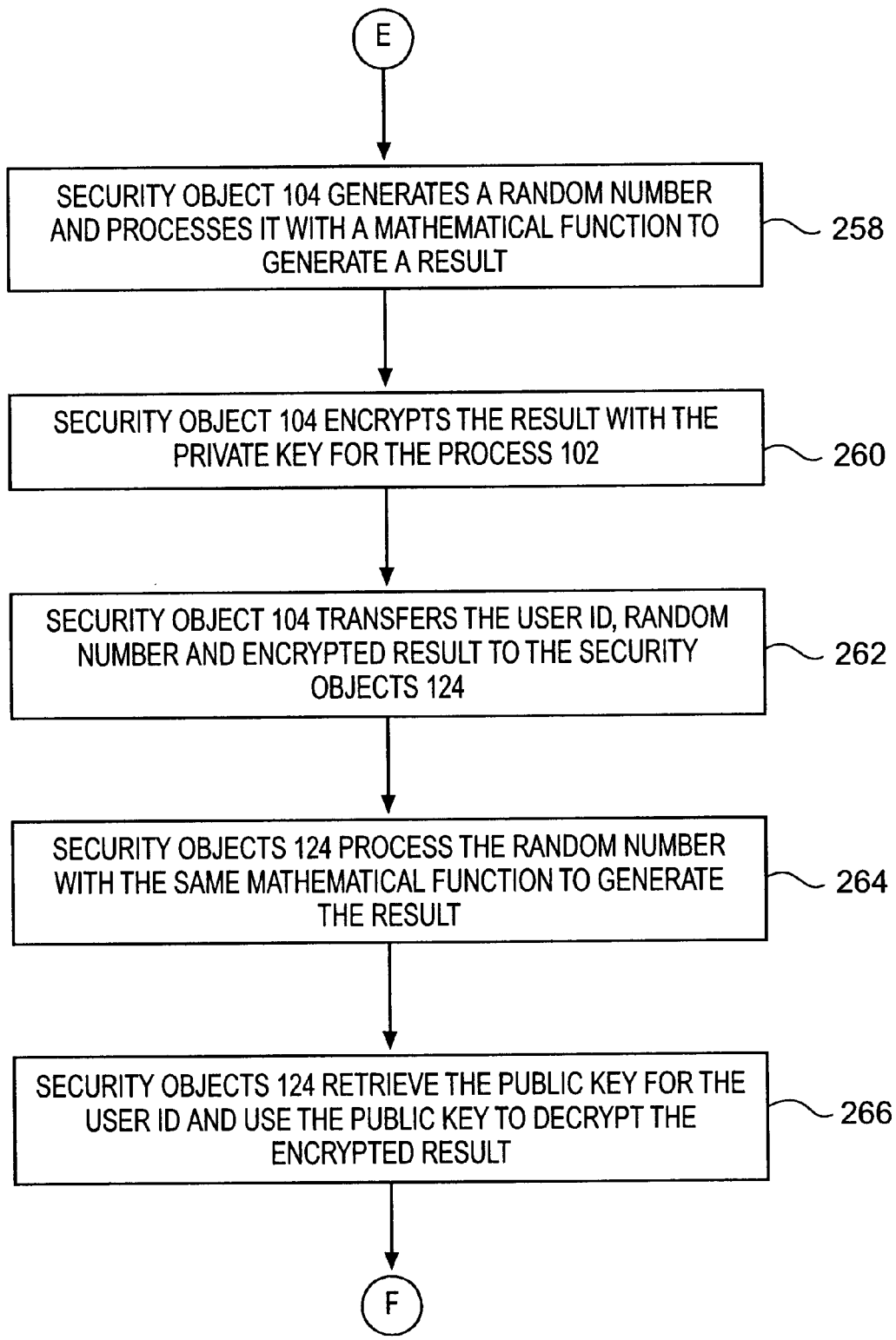
FIG. 7 is a flow diagram of system operation in an example of the invention.
Figure 8:
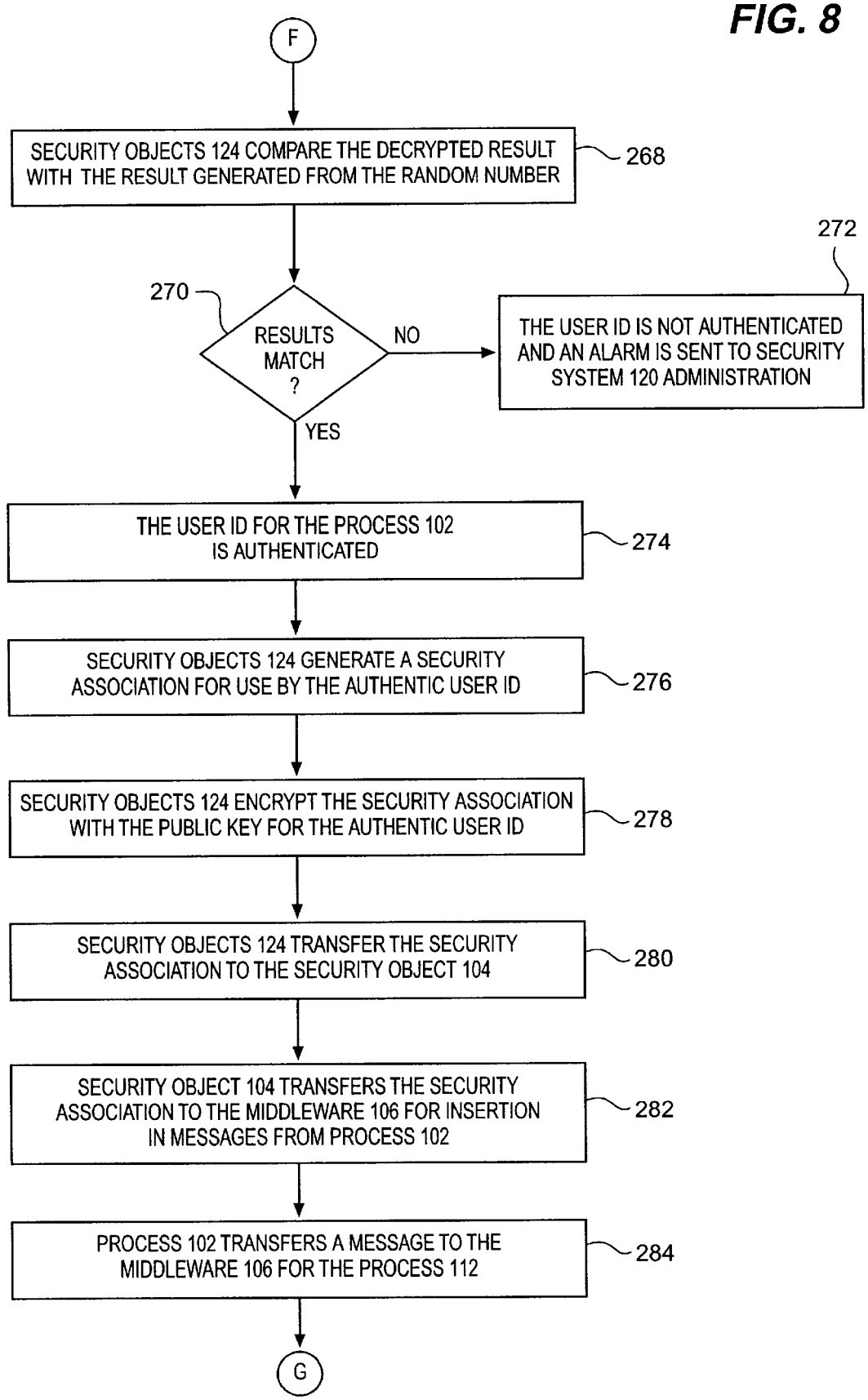
FIG. 8 is a flow diagram of system operation in an example of the invention.
Figure 9:
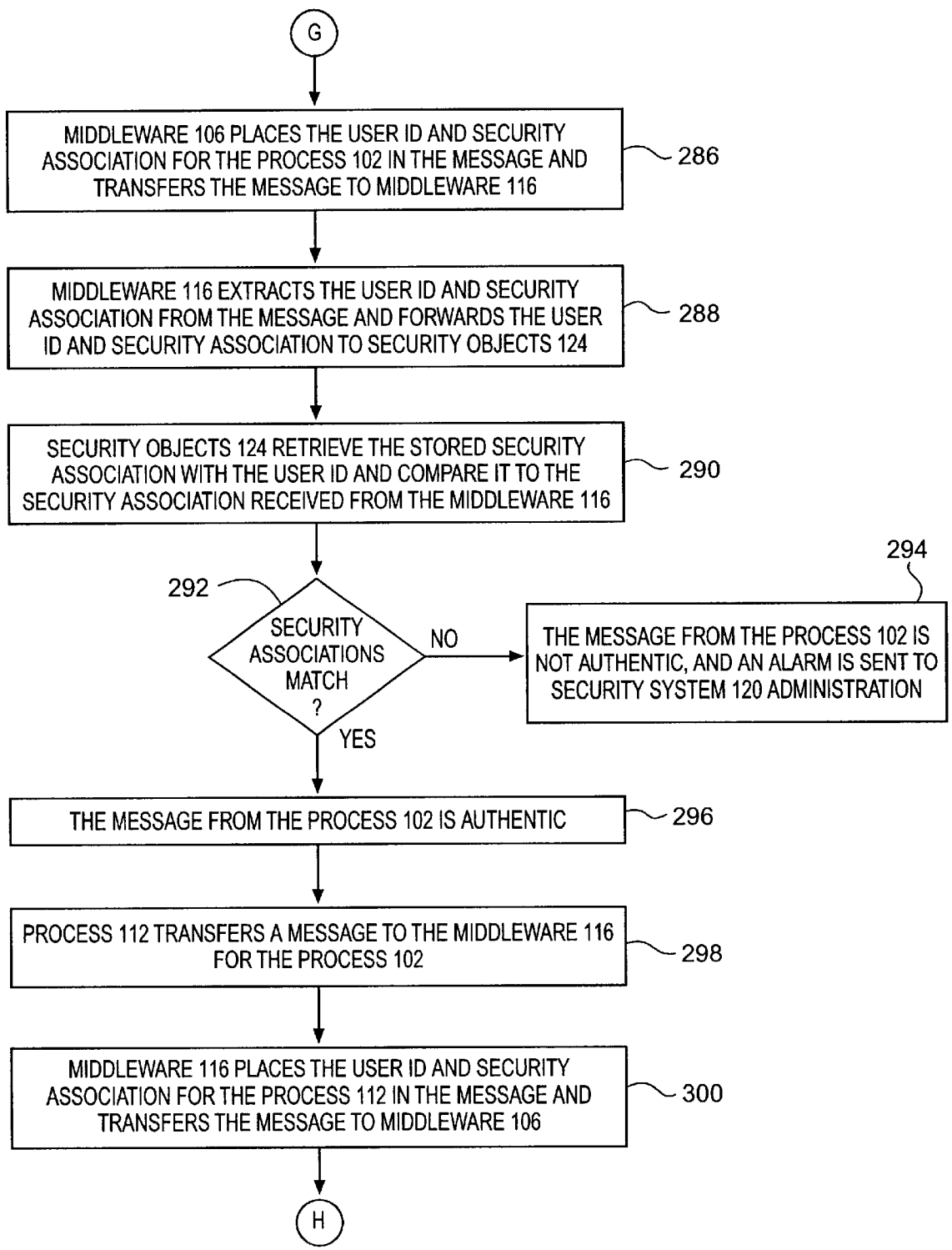
FIG. 9 is a flow diagram of system operation in an example of the invention.
Figure 10:
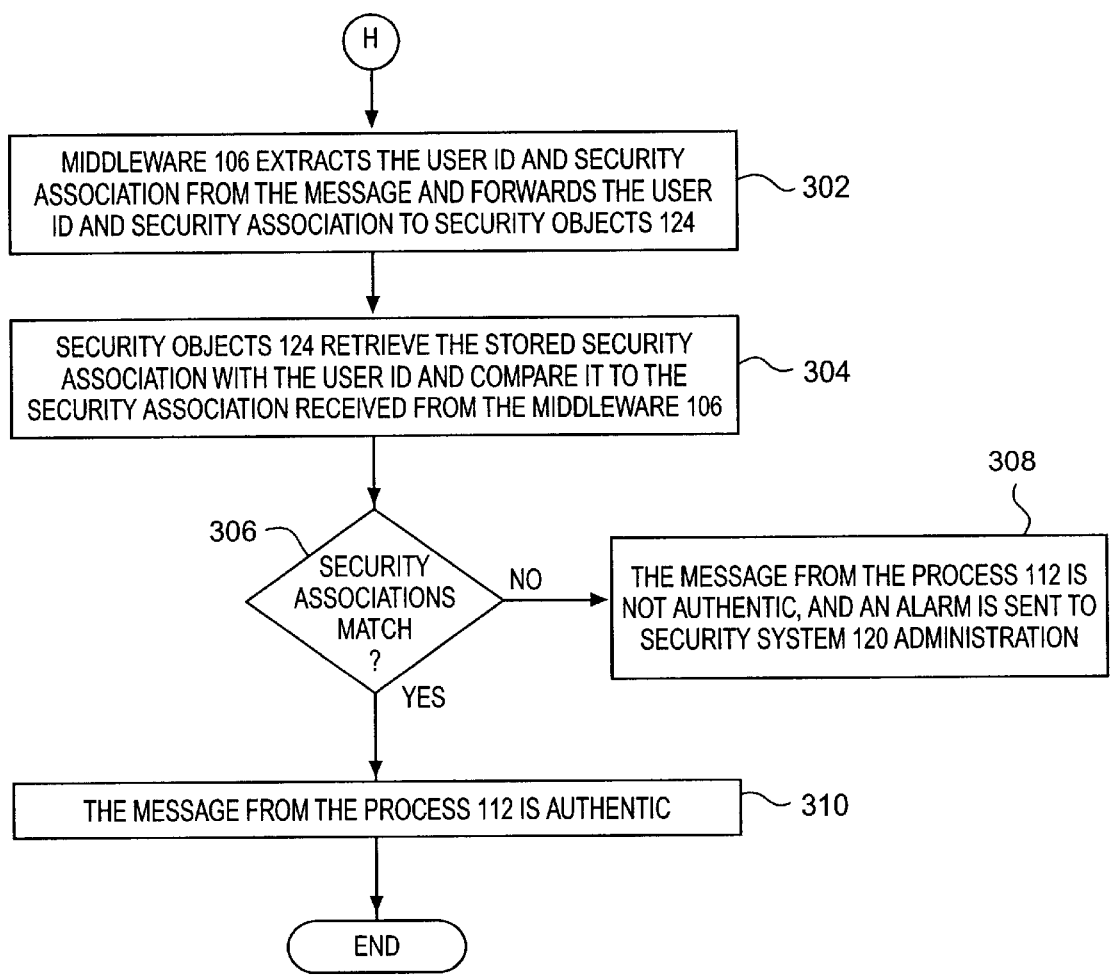
FIG. 10 is a flow diagram of system operation in an example of the invention.

FIG. 1 depicts a first system 100 connected to a second system 110. The second system 110 is connected to a security system 120. The first system 100 comprises a process 102, security object 104, middleware 106, and transport 108. The second system 110 comprises a process 112, security object 114, middleware 116, and transport 118. The security system 120 comprises security objects 124, middleware 126, and transport 128.

The processes 102 and 112 represent any type of software application that communicates with other processes through middleware. Some examples of processes 102 and 112 include graphical user interfaces, communications provider agents, communications user agents, client software, and server software. The processes 102 and 112 are typically written in languages such as Java, C, C++, and Small Talk, although other languages could also be used.

The security objects 104, 114, and 124 represent software that authenticates the processes 102 and 112 and their respective messaging. Although security object 104 and security object 114 are referred to in the singular, they could be comprised of multiple objects. The security objects 124 contain additional logic not required in security objects 104 and 114. The security objects 104, 114, and 124 are written in object-oriented languages such as C++ and Small Talk, although other languages could also be used.

The middleware 106, 116, and 126 represents any software interface between the processes 102 and 112. Some examples of middleware 106, 116, and 126 include Common Object Request Broker Architecture (CORBA) and the Microsoft Distributed Component Object Model (DCOM). Under the control of the security objects 104, 114, and 124 the middleware 106, 116, and 126 is operational to insert and extract security information within inter-process messages.

The transport 108, 118, and 128 represent a transport layer that is capable of supporting inter-process communications through the middleware 106, 116, and 126. Some examples of transport 108, 118, and 128 include Transaction Control Protocol/Internet Protocol (TCP/IP) and Asynchronous Transfer Mode (ATM).

The above-described elements are comprised of software that is stored on storage media accessible by processors in the respective systems. Some examples of storage media are memory devices, tape, disks, integrated circuits, and servers. The software is operational when executed by the processors to direct the processor to operate in accord with the invention. The term "processor" refers to a single processing device or a group of inter-operational processing devices. Some examples of processors are computers, integrated circuits, and logic circuitry. Those skilled in the art are familiar with software, processors, and storage media.

FIGS. 2–10 illustrate the operation of the systems 100, 110, 120. The operation starts on FIG. 2 where the security objects 124 generate a public/private key pair for the user ID representing the process 112 in step 200. The security objects 124 store the public key and user ID for the process 112 in step 202. The security objects 124 provide the private key and user ID for distribution to the system 110 in step 204 through a trusted method, such as certified mail or secure communications link. If desired, the security object 114 could first be programmed with the user ID and private key for process 112 and then to distributed to the system 110 through a trusted method for installation by the end-user.

The security object 114 obtains a password from the process 112 through the middleware 116 in step 206. The security object 114 encrypts the private key for the process 112 with the password in step 208. The private key is stored in an encrypted version. The password may be entered by an end-user, so the end-user can prevent unauthorized access by not storing, writing down, or sharing their password. If an end-user is not available during log-in to supply a password, then the password can be placed in a file for the security object 114 to read upon initialization.

The process 112 logs-in by transferring its password to the security object 114 through the middleware 116 in step 210. The security object 114 uses the password to decrypt the private key for the process 112 in step 212. The security object 114 generates a random number and processes it with a mathematical function to generate a result in step 214. The security object 114 encrypts the result with the private key for the process 112 in step 216. The security object 114 transfers the user ID, random number, and encrypted result to the security objects 124 in step 218 through the middleware 116, transport 118, transport 128, and middleware 126.

The security objects 124 process the random number with the same mathematical function to generate the same result in step 220. The security objects 124 retrieve the public key for the user ID and use the public key to decrypt the encrypted result in step 222. In step 224, the security objects 124 compare the decrypted result with the result generated from the random number. If the two results do not match in step 226, then the user ID is not authenticated and an alarm is sent to security system 120 administration in step 228. If the two results match in step 226, then the user ID for the process 112 is authenticated in step 230.

After authentication, the security objects 124 generate a security association for use by the authentic user ID in step 232. The security association is typically a random number. The security objects 124 encrypt the security association with the public key for the authenticated user ID in step 234. The security objects 124 transfer the security association to the security object 114 in step 236 through the middleware 126, transport 128, transport 118, and middleware 116. The security object 114 decrypts and transfers the security association to the middleware 116 in step 238 for insertion in messages from the process 112.

The security objects 124 generate a public/private key pair for the user ID representing the process 102 in step 240. The security objects 124 store the public key and user ID for the process 102 in step 242 and provide the private key and user ID for distribution to the system 100 in step 244 through a trusted method, such as certified mail or secure communications link. The security object 104 obtains a password from the process 102 through the middleware 106 in step 246. The security object 104 encrypts the private key for the process 102 with the password in step 248.

The process 102 logs-in by transferring its password to the security object 104 through the middleware 106 in step 250. The security object 104 uses the password to decrypt the private key for the process 102 in step 252. The security object 104 generates a random number and processes it with a mathematical function to generate a result in step 258. The security object 104 encrypts the result with the private key for the process 102 in step 260. The security object 104 transfers the user ID, random number, and encrypted result to the security objects 124 in step 262 through the middleware 106, transport 108, transport 118, transport 128, and middleware 126.

The security objects 124 process the random number with the same mathematical function to generate the result in step 264. The security objects 124 retrieve the public key for the user ID and use the public to decrypt the encrypted result in step 266. The security objects 124 compare the decrypted result with the result generated from the random number in step 268. If the two results do not match in step 270, then the user ID is not authenticated and an alarm is sent to security system 120 administration in step 272. If the two results match in step 270, then the user ID for the process 102 is authenticated in step 274.

After authentication, the security objects 124 generate a security association for use by the authenticated user ID in step 276. The security objects 124 encrypt the security association with the public key for the authenticated user ID in step 278. The security objects 124 transfer the security association to the security object 104 in step 280 through the middleware 126, transport 128, transport 118, transport 108, and middleware 106. The security object 104 decrypts the security association and transfers the security association to the middleware 106 in step 282 for insertion in messages from process 102.

The process 102 transfers a message for the process 112 to the middleware 106 in step 284. The middleware 106 places the user ID and security association for the process 102 in the message and transfers the message to the middleware 116 through transport 108 and 118 in step 286. The middleware 116 extracts the user ID and security association from the message and forwards the user ID and security association to security objects 124 in step 288 through transport 118, transport 128, and middleware 126. The security objects 124 retrieve the stored security association with the user ID and compare it to the security association received from the middleware 116 in step 290. If the security associations do not match in step 292, then the message from the process 102 is not authentic, and an alarm is sent to security system 120 administration in step 294. If the two security associations match in step 292, then the message from the process 102 is authenticated in step 296.

The process 112 transfers a message for the process 102 to the middleware 116 in step 298. The middleware 116 places the user ID and security association for the process 112 in the message and transfers the message to the middleware 106 through transport 118 and 108 in step 300. The middleware 106 extracts the user ID and security association from the message and forwards the user ID and security association to security objects 124 in step 302 through transport 108, transport 118, transport 128, and middleware 126. The security objects 124 retrieve the stored security association with the user ID and compare it to the security association received from the middleware 106 in step 304. If the security associations do not match in step 306, then the message from the process 112 is not authentic, and an alarm is sent to security system 120 administration in step 308. If the two security associations match in step 306, then the message from the process 112 is authenticated in step 310.

In some embodiments of the invention, the transport layers 108, 118, and 128 can be configured to add additional security by adding a unique code to the messaging. For example, the security object 104 could provide the first eight bits of the security association for the process 102 to the transport 108 to place in the messaging from process 102. If the transport 108 is ATM, the eight-bit security association could be placed in the first octet of the ATM cell payload. Likewise, the security object 114 could provide the first eight bits of the security association for the process 112 to the transport 118 to place in the messaging from process 112. If the transport 108 and 118 are ATM, then the eight-bit security association could be placed in the first octet of the ATM cell payload. Transport 108 and 118 would then extract the 8-bit security associations and sender user IDs from received messages and forward them to the security objects 124 for authentication in a similar fashion as described above for the ORB layer.

In these embodiments, security is performed in three layers. The first layer is the application layer—the processes and objects—with password and process authentication. The second layer is the middleware layer with message authentication using security associations. The third layer is the transport layer with message authentication using security associations. The three layers of security provide a highly secure environment.

It should be appreciated that multiple processes could be resident within a given system and use the same security object. Each process could have its own password, user ID, and public/private keys, or various processes could share these items. A process could be invoked by a person or operate without human invocation. For example, the process could be communications software used by a person to access a network. In this case, the person could simply remember and enter the password into the process to log-in to the network. The process would then transfer the password and user ID to the security object for authentication by the security system. In another example, the process could reside in a network element, such as a server. The server could respond to various client requests without human intervention. In this other example, a security file in the server would be programmed with the password for retrieval by the security object.

One advantage of the security system is the ease with which processes can be developed and installed for use within a highly secured environment. The programmer need only design their process to provide a password to a local security object. The use of middleware provides an easy message interface to the programmer for this purpose. The security objects and middleware then handle the authentication of both the process and messages sent and received by the process. System users and devices only need the relatively thin client security objects, middleware, and transport software to operate in a highly secured environment.

Communications System Security Configuration—FIGS. 11–15

FIGS. 11–16 depict a detailed configuration for a specific implementation of the invention with respect to an advanced communications system, but the invention is not restricted to the specific implementation provided below. If desired, various features in this implementation could be incorporated into the configuration and operation described above.

Figure 11:
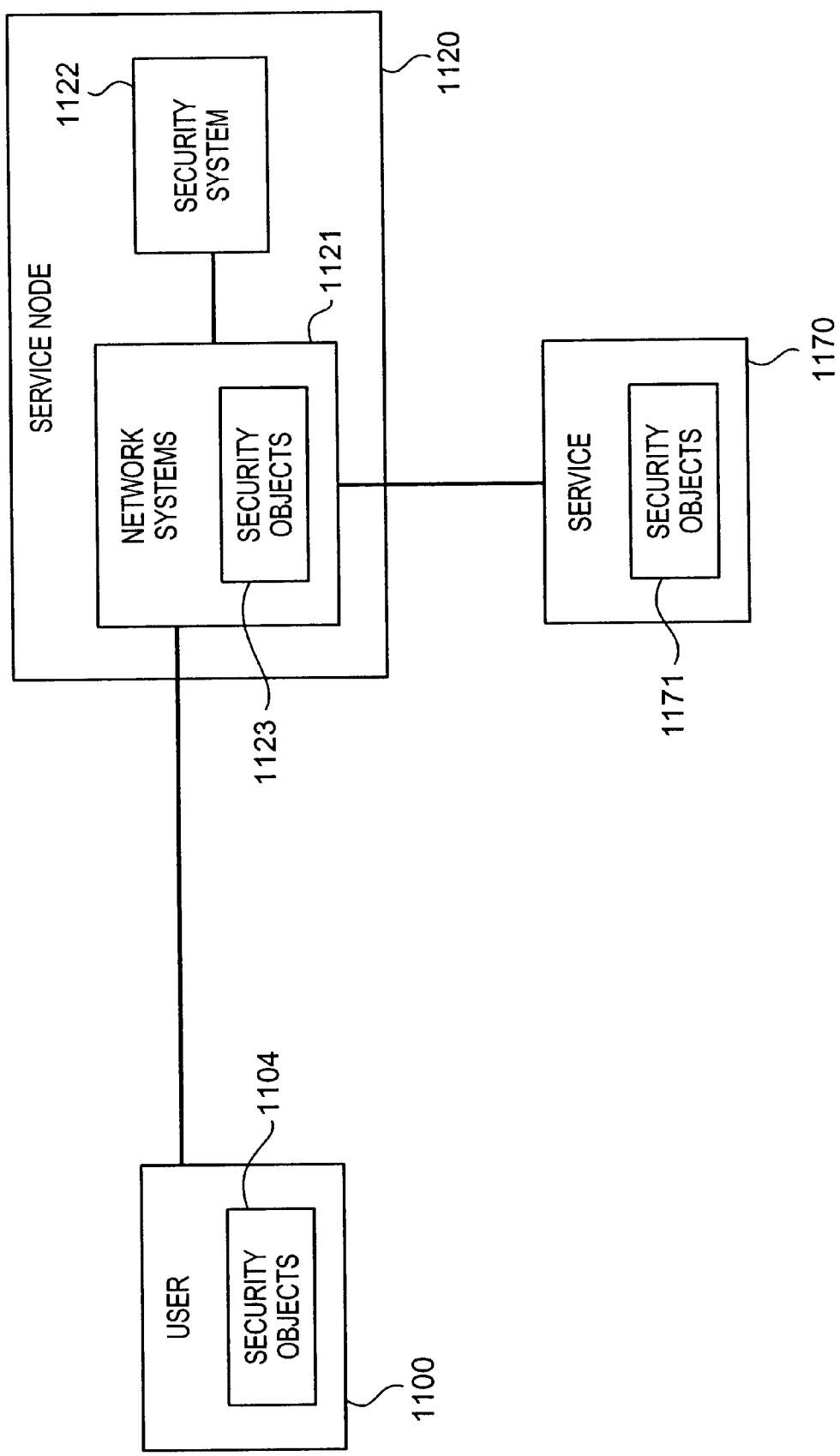
FIG. 11 is system-level block diagram of a communications system in an example of the invention.

FIG. 11 depicts a user 1100 and a service 1170 connected to a service node 1120. The service node 1120 includes network systems 1121 and security system 1122. The user 1100 communicates with the service 1170 through the network systems 1121 in the service node 1120. Security objects 1104, 1123, and 1171 are respectively included in the user 1100, network systems 1121, and service 1170. Network systems 1121 comprise individual systems that each have their own set of security objects 1123.

The security system 1122 in the service node 1120 works with the security objects 1104, 1123, and 1171 to provide authentic communications between the user 1100, network systems 1121, and the service 1170. For security purposes, the service 1170 is configured and operates much like the user 1100, except that the respective internal processes are different. For example, the user 1100 might represent an employee working at home on a personal computer using client processes, and the service 1170 might represent an office network with a server using server processes.

Figure 12:
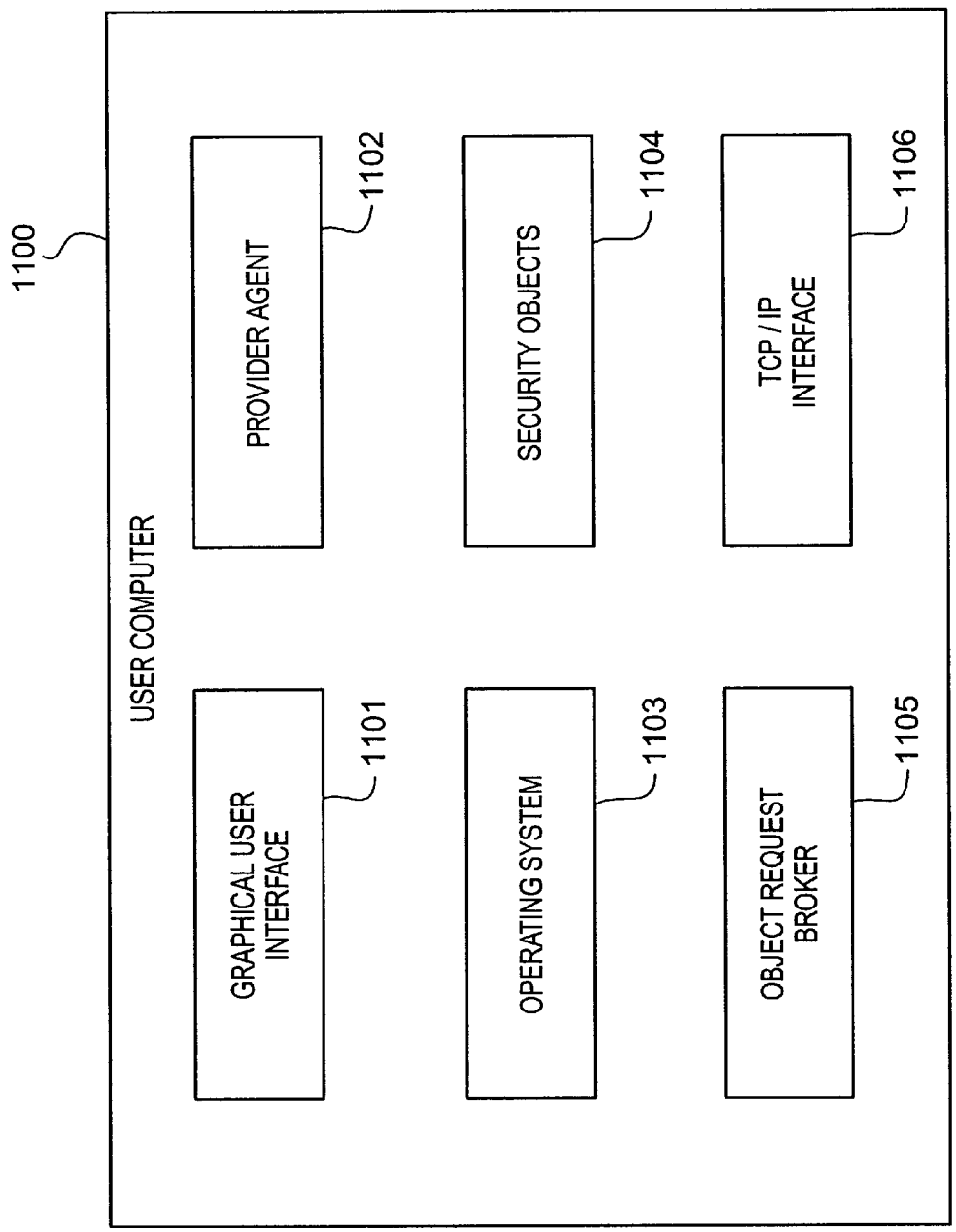
FIG. 12 is block diagram of a user system in an example of the invention.

FIG. 12 depicts the user 1100. The user 1100 comprises a personal computer configured with software. The software includes Graphical User Interface (GUI) 1101, provider agent 1102, operating system 1103, security objects 1104, Object Request Broker (ORB) 1105, and TCP/IP interface 1106.

The GUI 1101 is a client process similar to the process 102 of FIG. 1. The GUI 1101 provides the user with screens that prompt the user with communications service options. For example, the user may select a button to access the service 1170. The GUI 1101 is configured to store a user ID and collect a password from the end-user. The GUI 1101 is also configured to send a log-in message with the user ID and password to the security objects 1104 through the ORB 1105.

The provider agent 1102 is a client process similar to the process 102 of FIG. 1. The provider agent 1102 is based on the Telecommunications Information Network Architecture Consortium (TINA-C) and is known in the art. The provider agent 1102 manages communications sessions established through the service node 1120. The provider agent 1102 is the "local agent" for the service node 1120 in the user 1100 computer. The provider agent 1102 obtains a user ID and password from the GUI 1101. The provider agent 1102 is also configured to send a log-in message with the user ID and password to the security objects 1104 through the ORB 1105.

The operating system 1104 could be any software program to facilitate the execution of software on the user 1100 computer. One example is the Windows operating system provided by Microsoft of Redmond, Wash.

The ORB 1105 is a CORBA software interface that provides a language-neutral message exchange between client and server objects. Essentially, CORBA allows an object to expose and call methods of another object without regard to the location or programming language of the other object. The ORB 1105 is a version of the middleware 106 on FIG. 1.

A key aspect of CORBA is the use of a text-based Interface Description Language (IDL) to specify client and server object interfaces. The programmer specifies methods for the server object in an IDL text file that is compiled into client and server "stubs" based on the respective languages of the client and server objects. A client object uses the client stub to access the ORB 1105, and the server object uses the server stub to access the ORB 1105. Thus, communications from a client object to a server object pass through the client stub, ORB, and server stub. The use of CORBA allows the designer of the server object to define a language-neutral message set.

The ORB 1105 is configured to accept a user ID and security association from the security objects 1104. An interceptor within the ORB 1105 inserts the user ID and security association in the security context of the CORBA message wrapper for messages from that user ID. An interceptor also extracts the user ID and security association from the security context in incoming messages and forwards the user ID and security association to the security system 1122. Those skilled in the art are familiar with CORBA and ORBs that could be adapted to support the invention.

Security at the ORB layer is advantageous because CORBA exception messages currently have no security. If false exception messages are received from an impostor, typical CORBA functionality would process these false exceptions messages and degrade system performance to the point of a crash. The use of the security association eliminates the problem of non-secure exception messages.

The TCP/IP interface 1106 could be any software able to provide the user 1100 with communications functionality based on the TCP/IP Protocol. The TCP/IP interface 1106 is a version of the transport 108 in FIG. 1. The TCP/IP interface 1106 is configured to accept a user ID and security association from the security objects 1104. The TCP/IP interface 1106 inserts the user ID and security association in the IP message wrapper for messages from that user ID. The TCP/IP interface 1106 also extracts the user ID and security association from incoming messages and forwards user ID and security association to the security system 1122.

Figure 13:
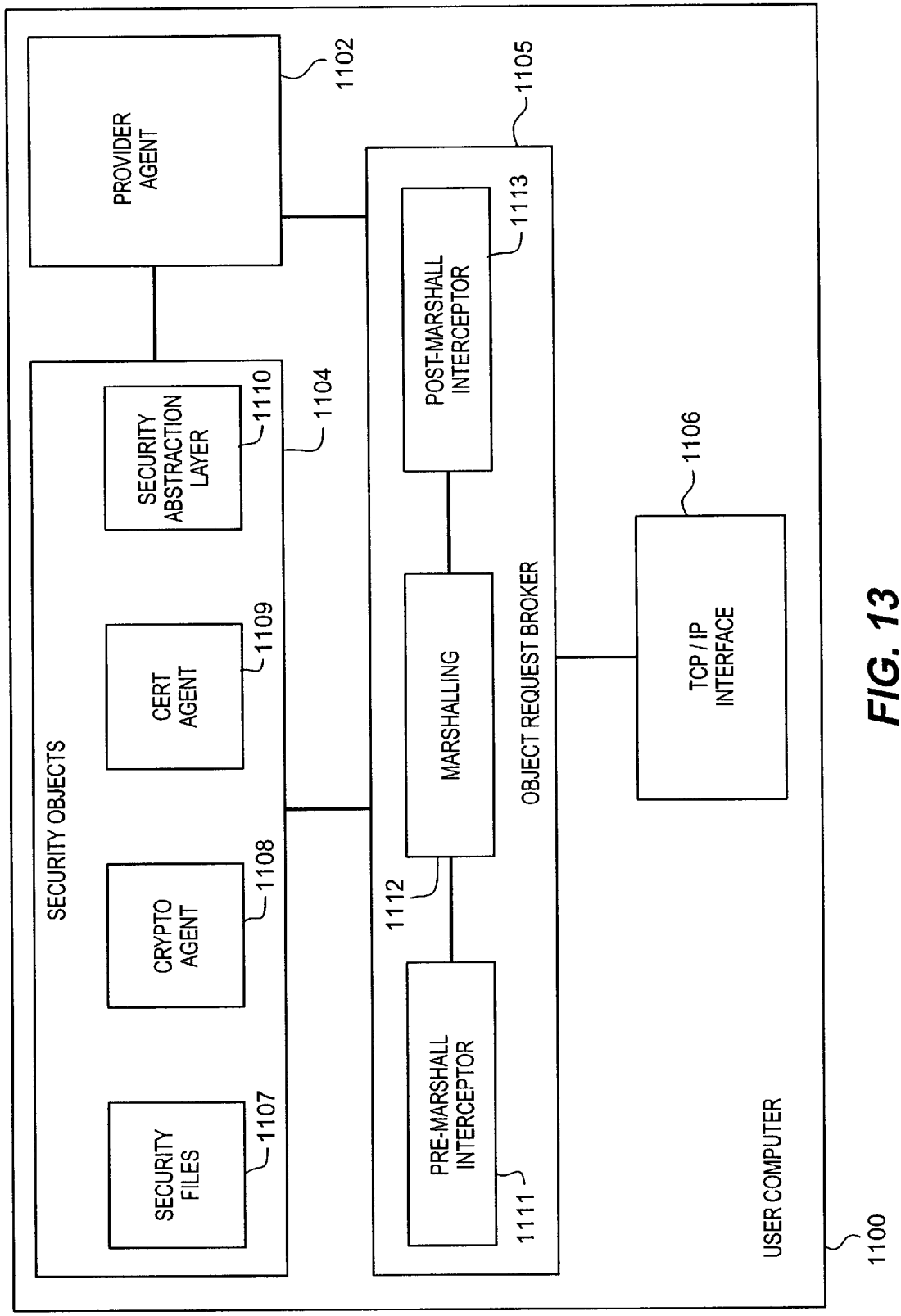
FIG. 13 is detailed block diagram of a user system in an example of the invention.

FIG. 13 depicts a detailed version of a portion of the user 1100. The security objects 1104 comprise security files 1107, crypto agent 1108, certification agent 1109, and security abstraction layer 1110. The ORB 1105 comprises pre-marshall interceptor 1111, marshalling 1112, and post-marshall interceptor 1113.

The security files 1107 contain initialization data for the crypto agent 1108 and the certification agent 1109. Initialization data might include information such as root directories and interface object reference file locations.

The crypto agent 1108 and the certification agent 1109 are IDL interfaces to the security abstraction layer 1110. The agents 1108 and 1109 provide a client IDL stub for the GUI 1101 and the provider agent 1102. The agents 1108 and 1109 provide a server IDL stub for the security abstraction layer 1110. The crypto agent 1108 includes methods to the encryption algorithm objects in the security abstraction layer 1110. The certification agent 1109 includes methods to the certificate management in the security abstraction layer 1110.

The security abstraction layer 1110 is based on the RSA library of security functions provided by RSA, Inc. The security functions include encryption, authentication, authorization, profile management, symmetric key generation, policy management, delegation, quality of service, and auditing. The RSA library is enclosed in a C++ wrapper that is accessed through the agent 1108, ORB 1105, and agent 1109. Those skilled in the art are familiar with the RSA library and these security functions.

It should be appreciated that the security abstraction layer 1110 is independent from the processes and objects that access it. This reduces the complexity of design since programmers may design processes and security objects that access the security abstraction layer 1110 through the IDL interfaces provided by the agents 1108 and 1109. Likewise, the security abstraction layer 1110 can be designed independently of these objects and processes because of the CORBA interface. For example, the current encryption algorithm, PKCS#5, could be upgraded through new security abstraction layer software without requiring new client training, applications, or software.

The ORB 1105 exchanges messages with GUI interface 1101, provider agent 1102, TCP/IP interface 1106, and certification agent 1109. A primary function of the ORB 1105 is marshalling 1112 where CORBA wrappers are added to and removed from messages. The CORBA wrappers include a security context field where security information is transmitted with each message. The pre-marshall interceptor 1111 processes messages before marshalling occurs, and the post-marshall interceptor 1113 processes messages after marshalling occurs. Either the pre-marshall interceptor 1111 or the post-marshall interceptor 1113 can insert values in the security context field of a CORBA message. The certification agent 1109 specifies the inserted values, typically a user ID and security association, to the ORB 1105. Either the pre-marshall interceptor 1111 or the post-marshall interceptor 1113 can extract values from the security context field of a CORBA message. The extracted values, typically the user ID and security association, are sent to the security system 1122 for message authentication.

If desired, the TCP/IP interface 1106 can also be configured to insert and extract security values in the TCP/IP wrapper. The certification agent 1109 specifies the inserted values, typically a user ID and security association, to the TCP/IP interface 1106. The extracted values, typically the user ID and security association, are sent to the security system 1122 for message authentication.

Figure 14:
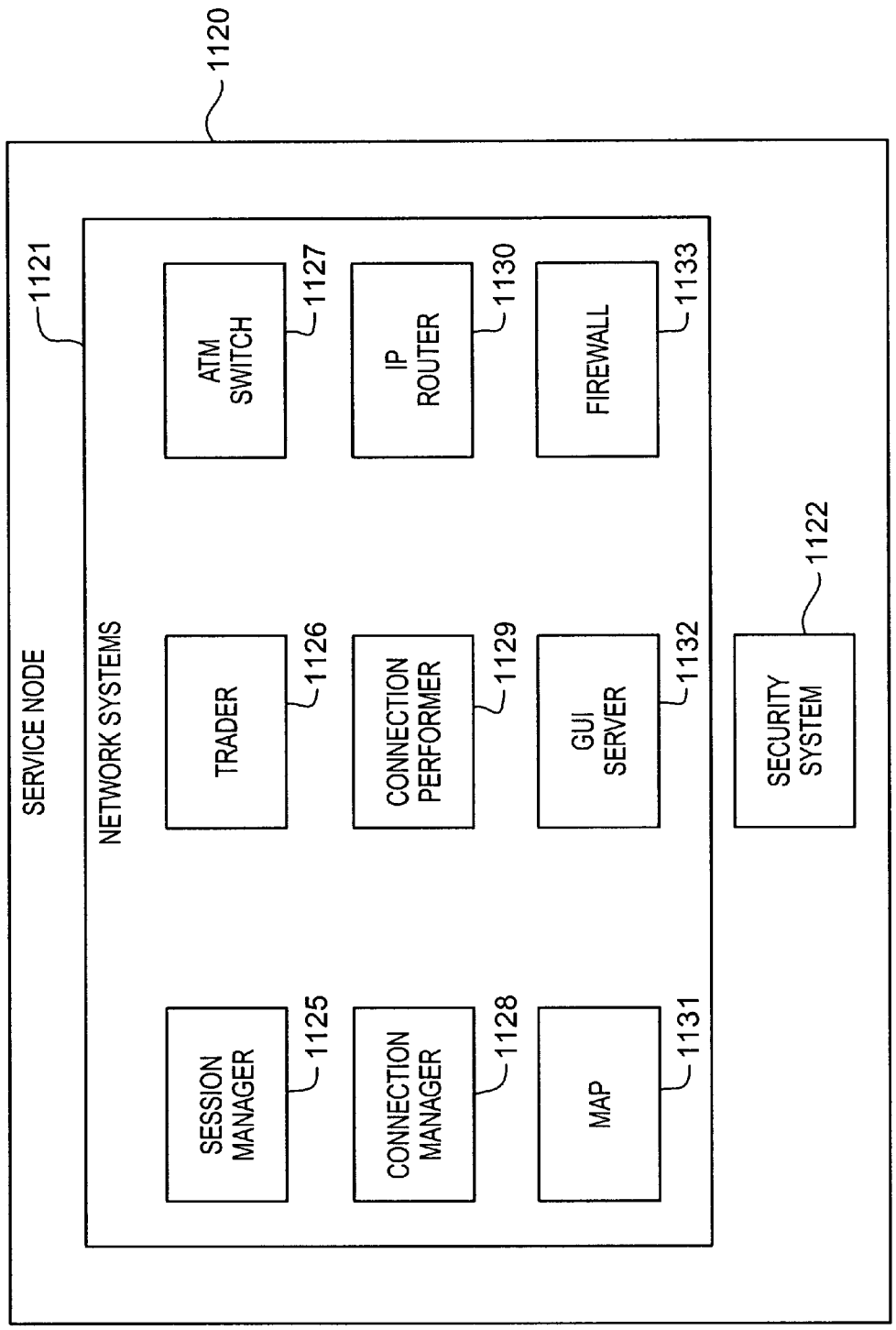
FIG. 14 is block diagram of a communications service node in an example of the invention.

FIG. 14 depicts the service node 1120 comprising the network systems 1121 and the security system 1122. The network systems 1121 comprise: session manager 1125, trader 1126, ATM switch 1127, connection manager 1128, connection performer 1129, IP router 1130, map 1131, GUI server 1132, and firewall 1133. The session manager 1125 is a TINA-C component that manages user communications sessions. For example, the session manager 1125 contains a user agent that interacts with the provider agent 1102 of the user 1100 to determine the end points for a communications session. The trader 1126 is a directory service for the object-oriented service node environment. The ATM switch 1127 establishes virtual communications paths under the control of the connection manager 1128. The connection manager 1128 is a TINA-C component that receives communications requirements from the session manager 1125 and directs the ATM switch 1127 to establish the appropriate virtual connections. The connection performer 1129 monitors the performance of the ATM connections. The IP router 1130 provides intranet services and a gateway to external IP systems. The map 1131 provides graphical displays of the topography of the network and particular user configurations. The GUI server 1132 interacts with the GUI 1101 at the user 1100 to provide menu screens and collect user information. The GUI server 1132 also stores an Information Object Representation (IOR) for the objects. The IOR specifies the physical address of the object by IP address, port number, and object ID, and can be accessed by other objects from the GUI server 1132. The firewall 1133 protects the service node 1120 on connections to external IP systems.

Figure 15:
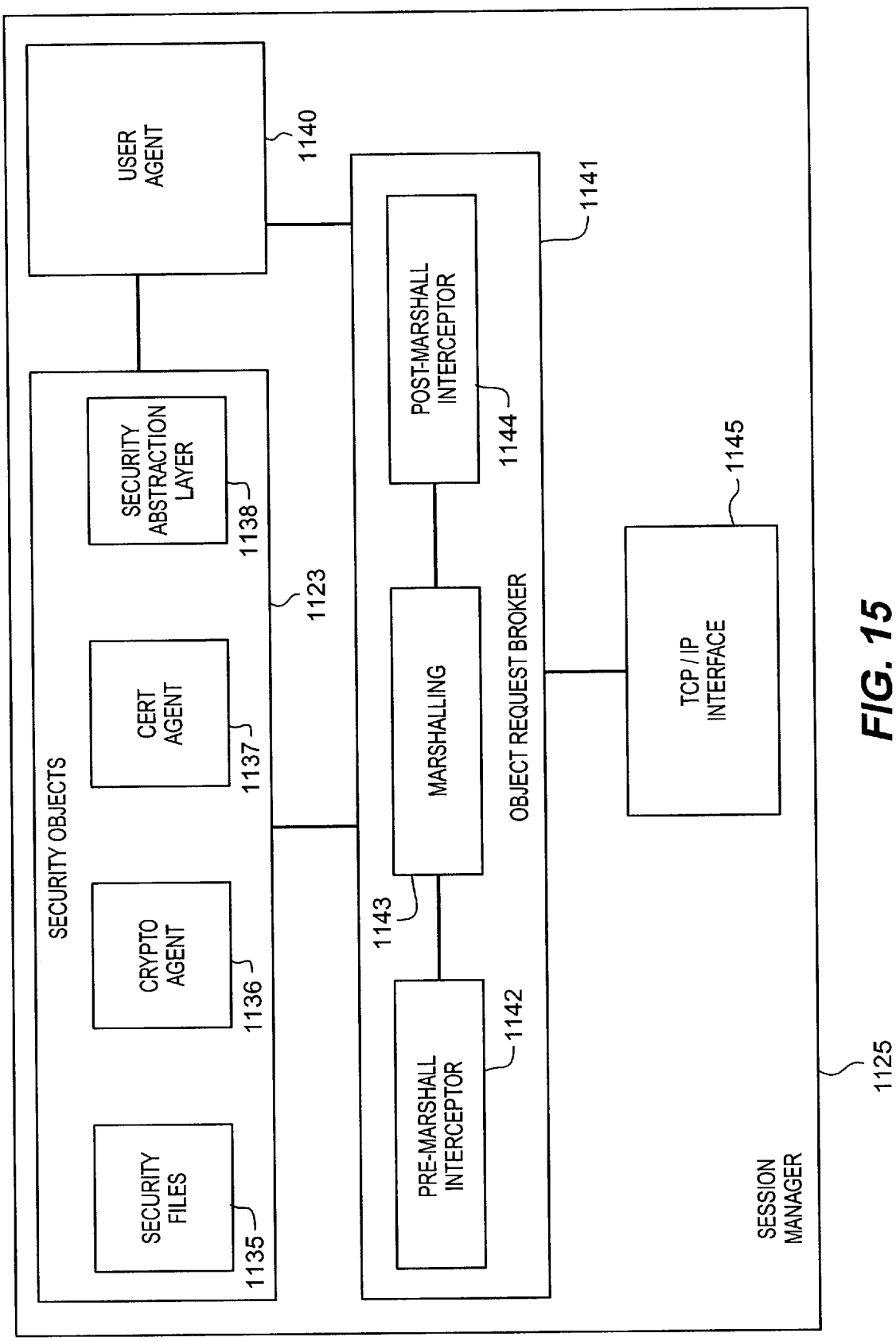
FIG. 15 is block diagram of a session manager in an example of the invention.

FIG. 15 depicts a detailed version of a portion of the session manager 1125. The session manager 1125 comprises security objects 1123, user agent 1140, ORB 1141, and TCP/IP interface 1145. The security objects 1123 comprise security files 1135, crypto agent 1136, certification agent 1137, and security abstraction layer 1138. The ORB 1141 comprises pre-marshall interceptor 1142, marshalling 1143, and post-marshall interceptor 1144. The user agent 1140 is a TINA-C component that works with the provider agent 1102 to establish and manage communications sessions. The remaining elements on FIG. 15 are similar to those described for the user 1100.

Figure 16:
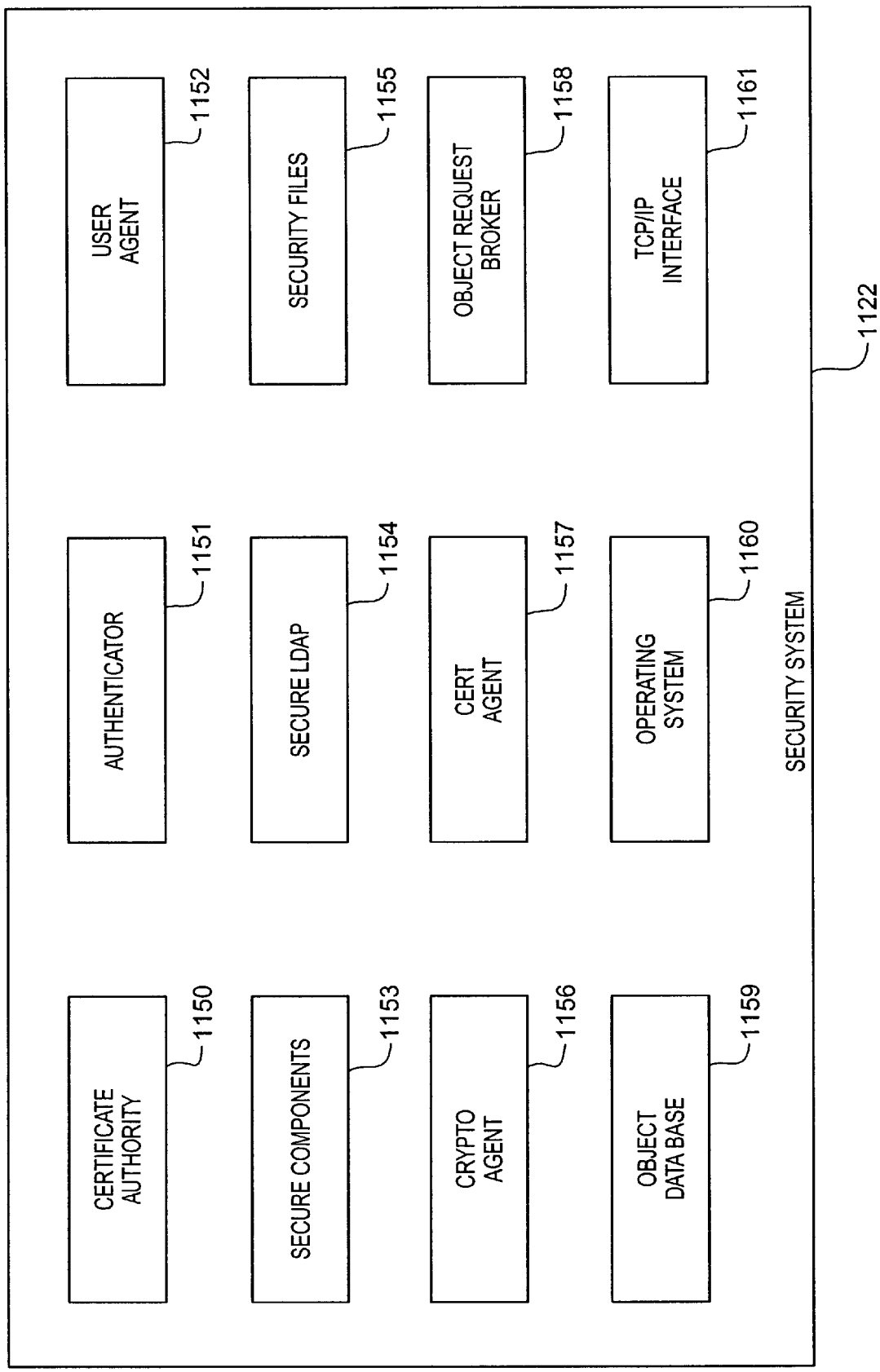
FIG. 16 is block diagram of a security system in an example of the invention.

FIG. 16 depicts the security system 1122. The security system 1122 could reside on a conventional server or group of inter-operating servers. The security system 1114 comprises: certificate authority 1150, authenticator 1151, user agent 1152, security components 1153, secure LDAP 1154, security files 1155, crypto agent 1156, certification agent 1157, ORB 1158, object database 1159, operating system 1160, and TCP/IP interface 1161. The certificate authority 1150 generates and verifies certificates for user IDs that bind a public key to a user ID. The certificate authority 1150 provides the certificates to requesting security objects. The authenticator 1151 exchanges data with certification agents to authenticate user IDs. The user agent 1152 receives security data from ORB interceptors to authenticate messages. The secure components 1153 form the security system 1122 interface to the trader 1126. The secure LDAP 1154 is the security system 1122 interface to X.500 based systems that request public keys. The security files 1155, crypto agent 1156, certification agent 1157, ORB 1158, and TCP/IP interface 1161 are similar to those elements described for the user 1100. The object database 1159 is advantageous because changes to a class are automatically reflected across all of the objects in the class. The operating system 1160 is Windows NT provided by Microsoft of Redmond, Wash. A security abstraction layer similar to the security abstraction layer 1110 is included in each of the elements 1150–1154.

Figure 17:
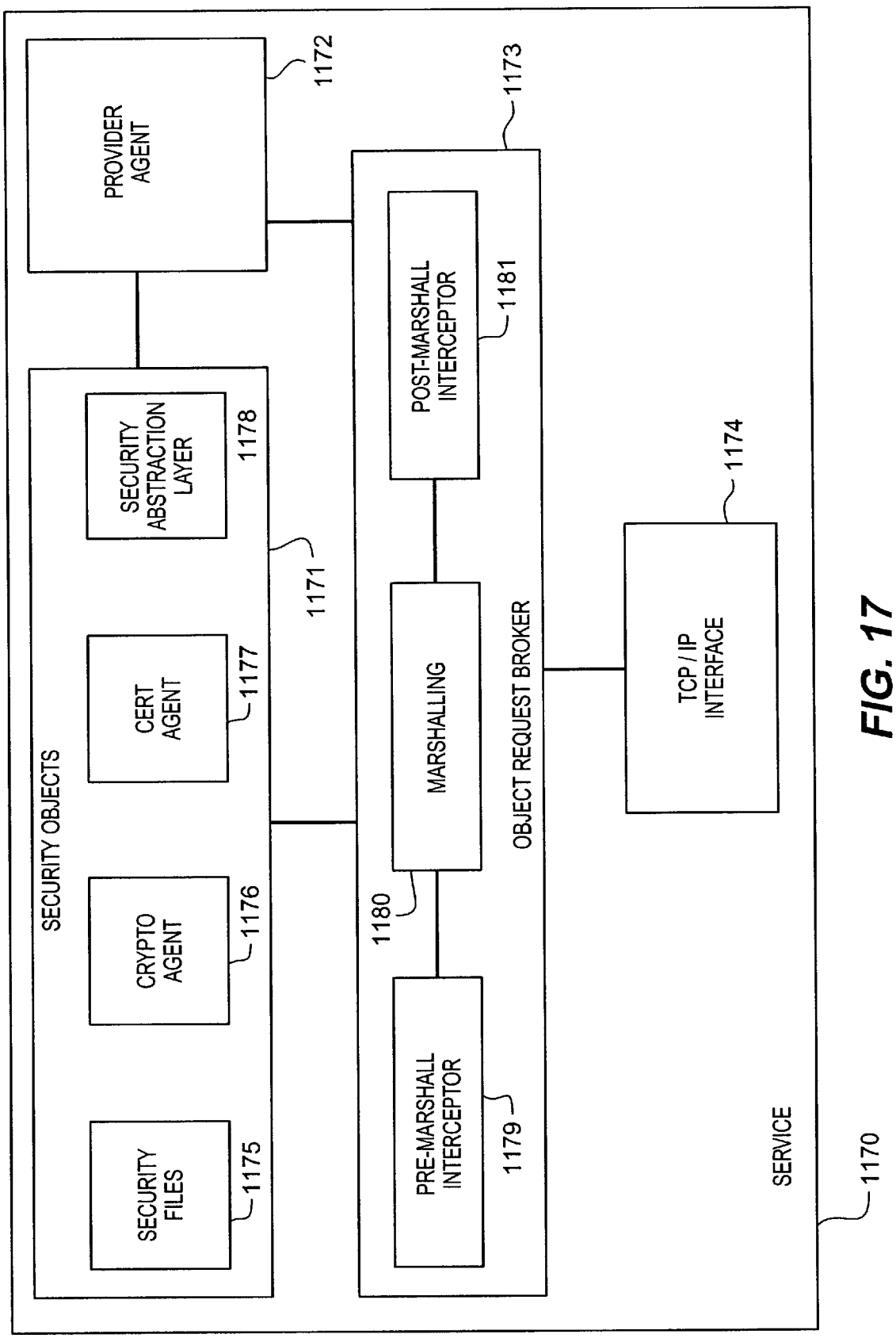
FIG. 17 is block diagram of a service system in an example of the invention.
Figure 18:
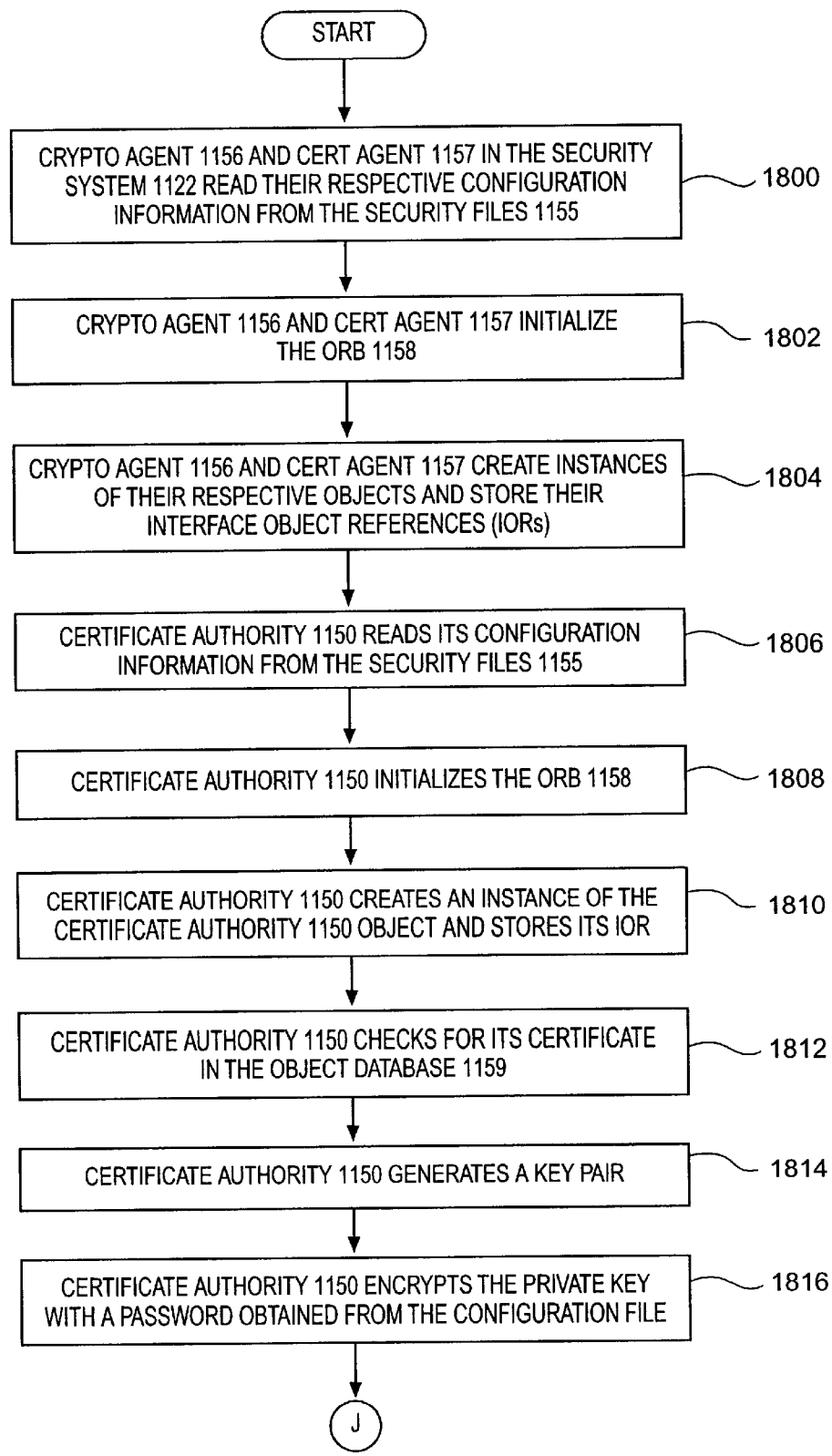
FIG. 18 is a flow diagram of communications system operation in an example of the invention.
Figure 19:
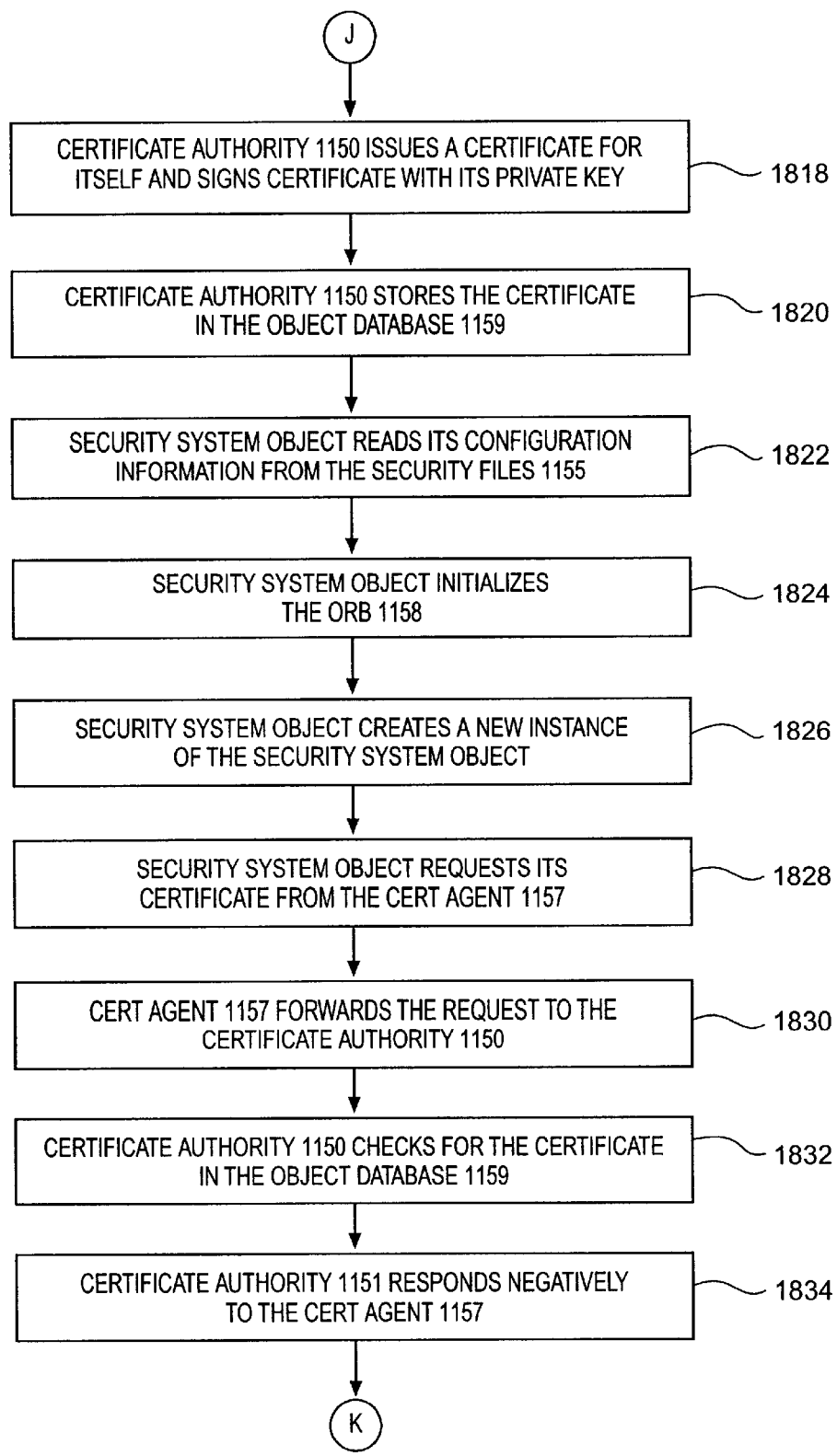
FIG. 19 is a flow diagram of communications system operation in an example of the invention.
Figure 20:
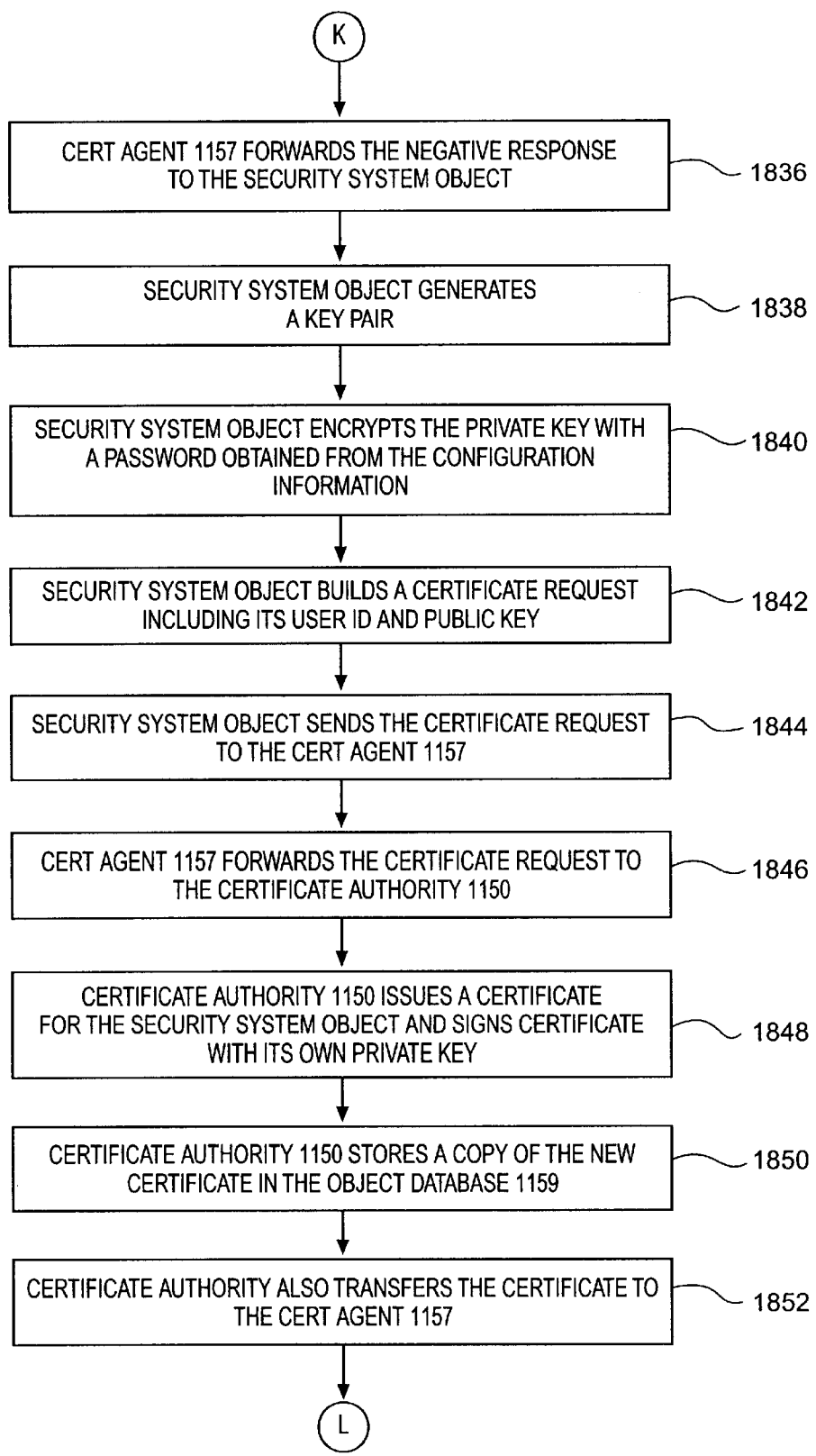
FIG. 20 is a flow diagram of communications system operation in an example of the invention.
Figure 21:
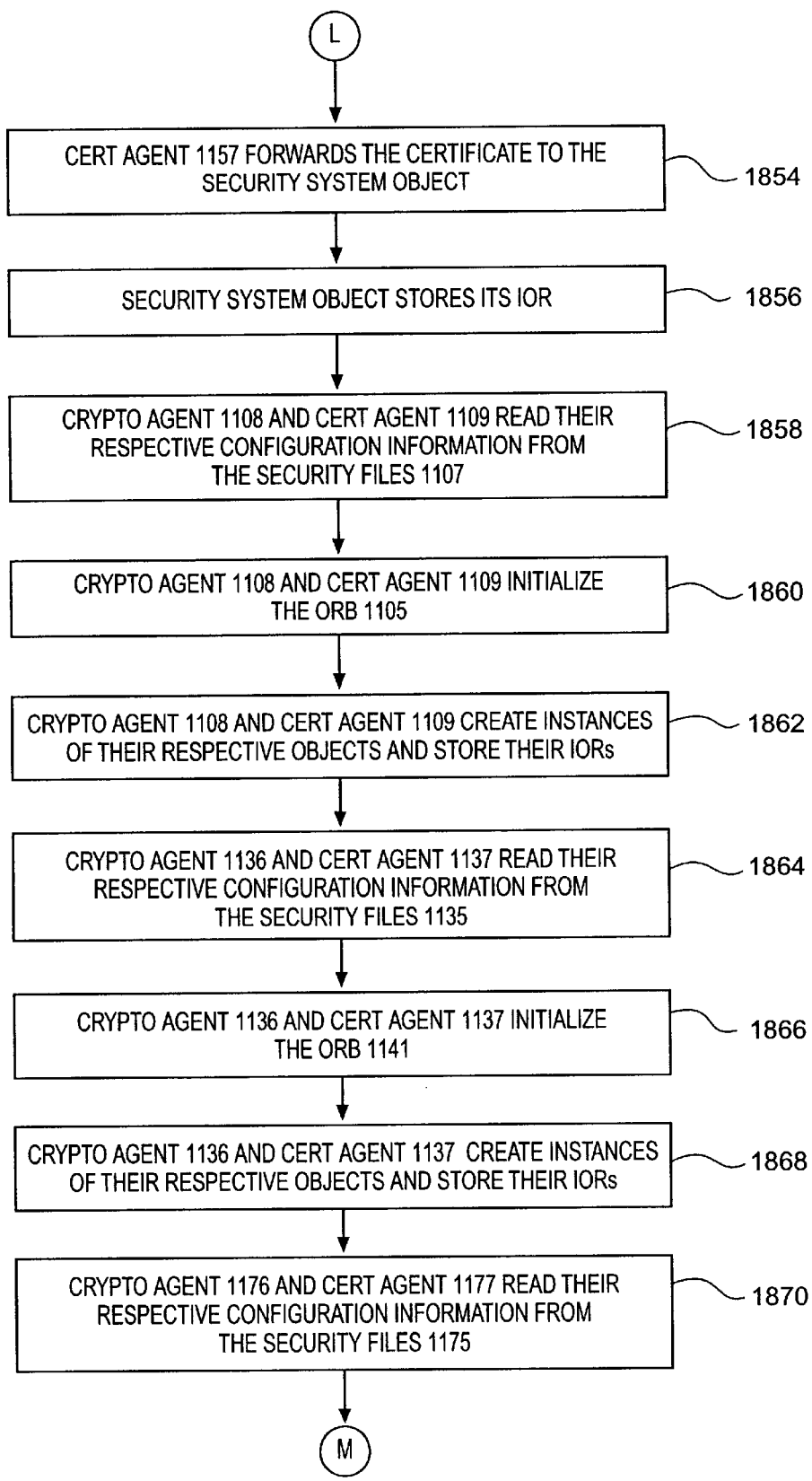
FIG. 21 is a flow diagram of communications system operation in an example of the invention.
Figure 22:
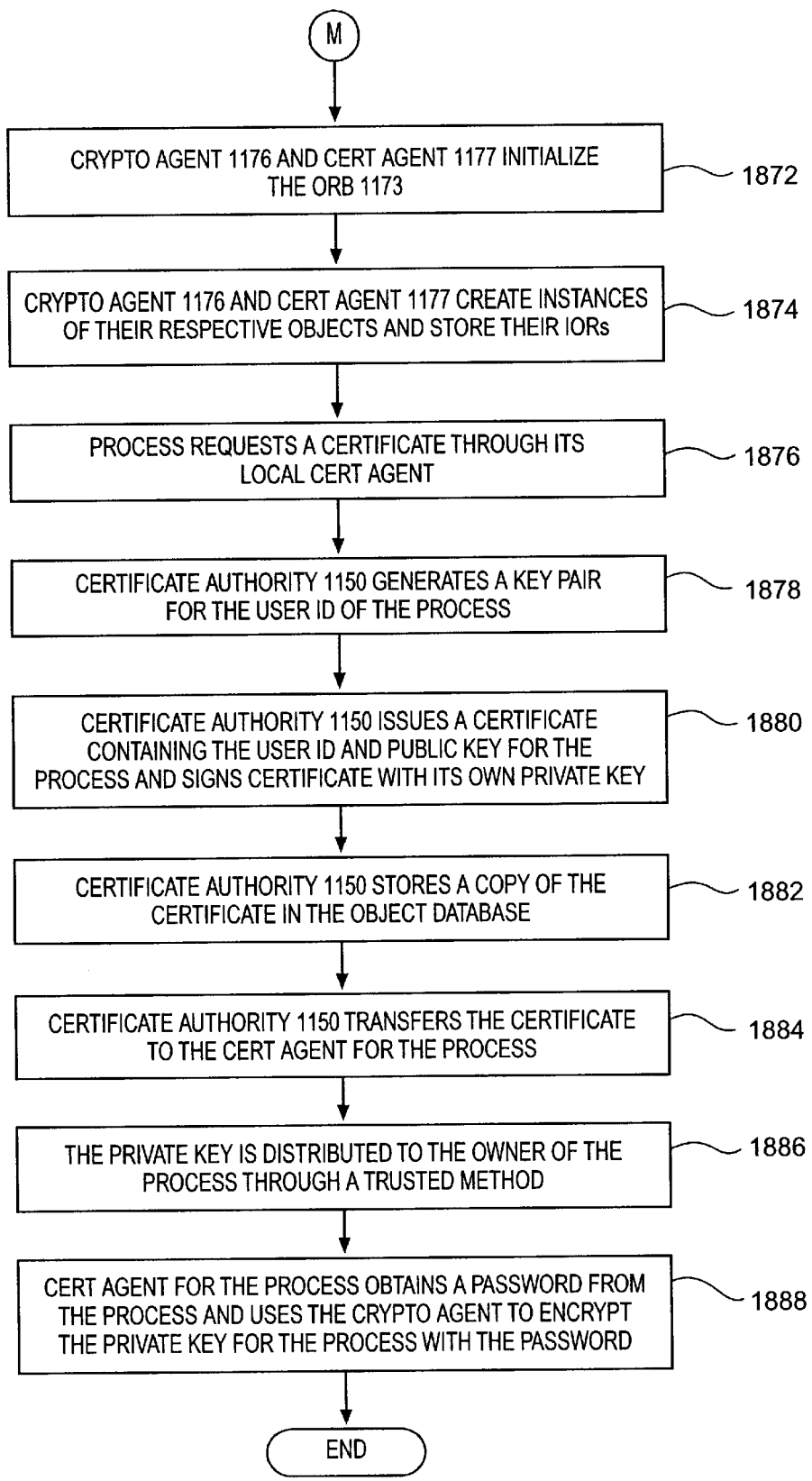
FIG. 22 is a flow diagram of communications system operation in an example of the invention.

FIG. 17 depicts a detailed version of a portion of the service 1170. The service 1170 comprises security objects 1171, provider agent 1172, ORB 1173, and TCP/IP interface 1174. The security objects 1171 comprise security files 1175, crypto agent 1176, certification agent 1177, and security abstraction layer 1178. The ORB 1173 comprises pre-marshall interceptor 1179, marshalling 1180, and post-marshall interceptor 1181. The provider agent 1172 is a TINA-C component that works with the user agent 1140 to establish and manage communications sessions. The remaining elements on FIG. 17 are similar to those described for the user 1110.

Communications System Security Initialization—FIGS. 18–22

FIGS. 18–22 depict the security initialization for the user 1100, service node 1120, and service 1170. Initialization starts on FIG. 18 where the crypto agent 1156 and certification agent 1157 in the security system 1122 read their respective configuration information from the security files 1155 in step 1800. The crypto agent 1156 and certification agent 1157 initialize the ORB 1158 in step 1802. In step 1804, the crypto agent 1156 and certification agent 1157 create instances of their respective objects and store their IORs in the IOR file specified the configuration information.

The certificate authority 1150 reads its configuration information from the security files 1155 in step 1806. The certificate authority 1150 initializes the ORB 1158 in step 1808. The certificate authority 1150 creates an instance of the certificate authority 1150 object and stores its IOR in the IOR file specified in the configuration information in step 1810. The certificate authority 1150 checks for its certificate in the object database 1159 in step 1812. Since there is not yet a certificate for the certificate authority 1150 in the object database 1159, the certificate authority 1150 generates a key pair in step 1814. The certificate authority 1150 encrypts the private key in step 1816 with a password obtained from the configuration file. The certificate authority 1150 issues a certificate for itself and signs certificate with its private key in step 1818. The certificate authority 1150 stores the certificate in the object database 1159 in step 1820.

The authenticator 1151, user agent 1152, secure components 1153, and secure LDAP 1154 initialize in the same way and are each referred to in this paragraph as "security system object". The security system object reads its configuration information from the security files 1155 in step 1822. The security system object initializes the ORB 1158 in step 1824. The security system object creates a new instance of the security system object in step 1826. The security system object requests its certificate from the certification agent 1157 in step 1828. The certification agent 1157 forwards the request to the certificate authority 1150 in step 1830. The certificate authority 1150 checks for the certificate in the object database 1159 in step 1832. Since there is not yet a certificate for the security system object in the object database 1159, the certificate authority 1151 responds negatively to the certification agent 1157 in step 1834. The certification agent 1157 forwards the negative response to the security system object in step 1836. With no certificate, the security system object generates a key pair in step 1838. The security system object encrypts the private key in step 1840 with a password obtained from the configuration information. The security system object builds a certificate request including its user ID and public key in step 1842. The security system object sends the certificate request to the certification agent 1157 in step 1844. The certification agent 1157 forwards the certificate request to the certificate authority 1150 in step 1846. The certificate authority 1150 issues a certificate for the security system object and signs the certificate with its own private key in step 1848. The certificate authority 1150 stores a copy of the new certificate in the object database 1159 in step 1850. The certificate authority also transfers the certificate to the certification agent 1157 in step 1852. The certification agent 1157 forwards the certificate to the security system object in step 1854. The security system object stores its IOR in the IOR file specified the configuration information in step 1856.

To initialize the user 1100, the crypto agent 1108 and certification agent 1109 read their respective configuration information from the security files 1107 in step 1858. The crypto agent 1108 and certification agent 1109 initialize the ORB 1105 in step 1860. The crypto agent 1108 and certification agent 1109 create instances of their respective objects and store their IORs in the IOR file specified in the configuration information in step 1862.

To initialize the session manager 1125, the crypto agent 1136 and certification agent 1137 read their respective configuration information from the security files 1135 in step 1864. The crypto agent 1136 and certification agent 1137 initialize the ORB 1141 in step 1866. The crypto agent 1136 and certification agent 1137 create instances of their respective objects and store their IORs in the IOR file specified in the configuration information in step 1868. Other network systems 1121 would initialize in a similar manner.

To initialize the service 1170, the crypto agent 1176 and certification agent 1177 read their respective configuration information from the security files 1175 in step 1870. The crypto agent 1176 and certification agent 1177 initialize the ORB 1173 in step 1872. The crypto agent 1176 and certification agent 1177 create instances of their respective objects and store their IORs in the IOR file specified in the configuration information in step 1874.

The processes in the user 1100, network systems 1121, and service 1170 must obtain certificates to operate within the communications system. For example, the provider agent 1102 will need a certificate that binds its user ID and public key within the security system 1122. The user agent 1140 and the provider agent 1172 will also require certificates. The security system 1114 issues these certificates using the certificate authority 1150.

When a process requests a certificate through its local certification agent in step 1876, the certificate authority 1150 generates a key pair for the user ID of the process in step 1878. The certificate authority 1150 issues a certificate containing the user ID and public key for the process and signs the certificate with its own private key in step 1880. The certificate authority 1150 stores a copy of the certificate in the object database 1159 in step 1882 and transfers the certificate to the certification agent for the process in step 1884. The public key can be made available to the public domain through the secure LDAP 1154. The private key is distributed to the owner of the process through a trusted method in step 1886, such as certified mail or secure communications link. If desired, the certification agent for the process could first be programmed with the user ID and private key and then the certification agent could be distributed to the end-user through a trusted method for installation. The certification agent for the process obtains a password from the process and uses the crypto agent to encrypt the private key for the process with the password in step 1888.

It should be appreciated that the security system is now ready to operate. The pertinent security objects and processes all store password-encrypted private keys and have registered certificates with the security system that bind their user ID with their public key.

Figure 23:
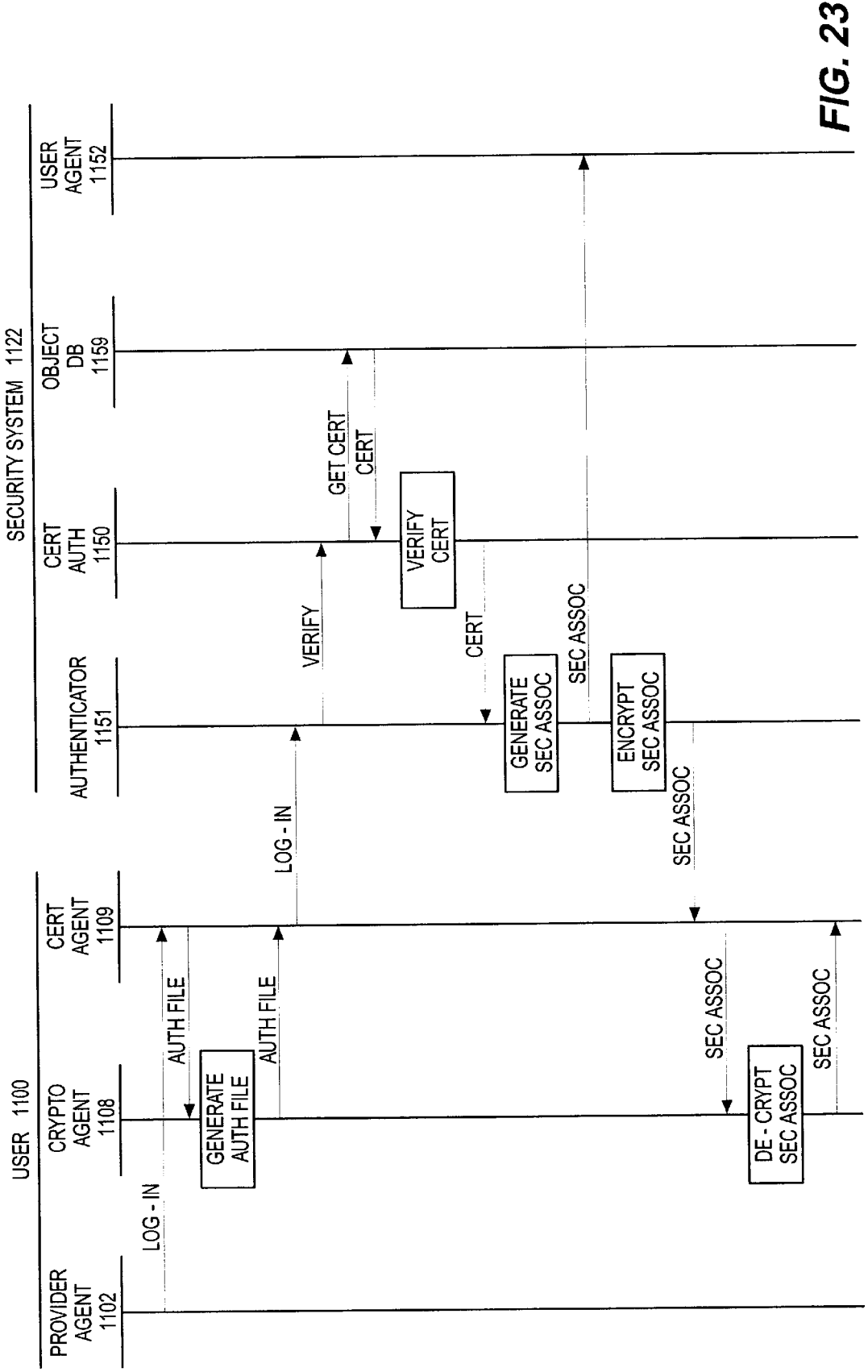
FIG. 23 is a process diagram of communications system operation in an example of the invention.
Figure 24:
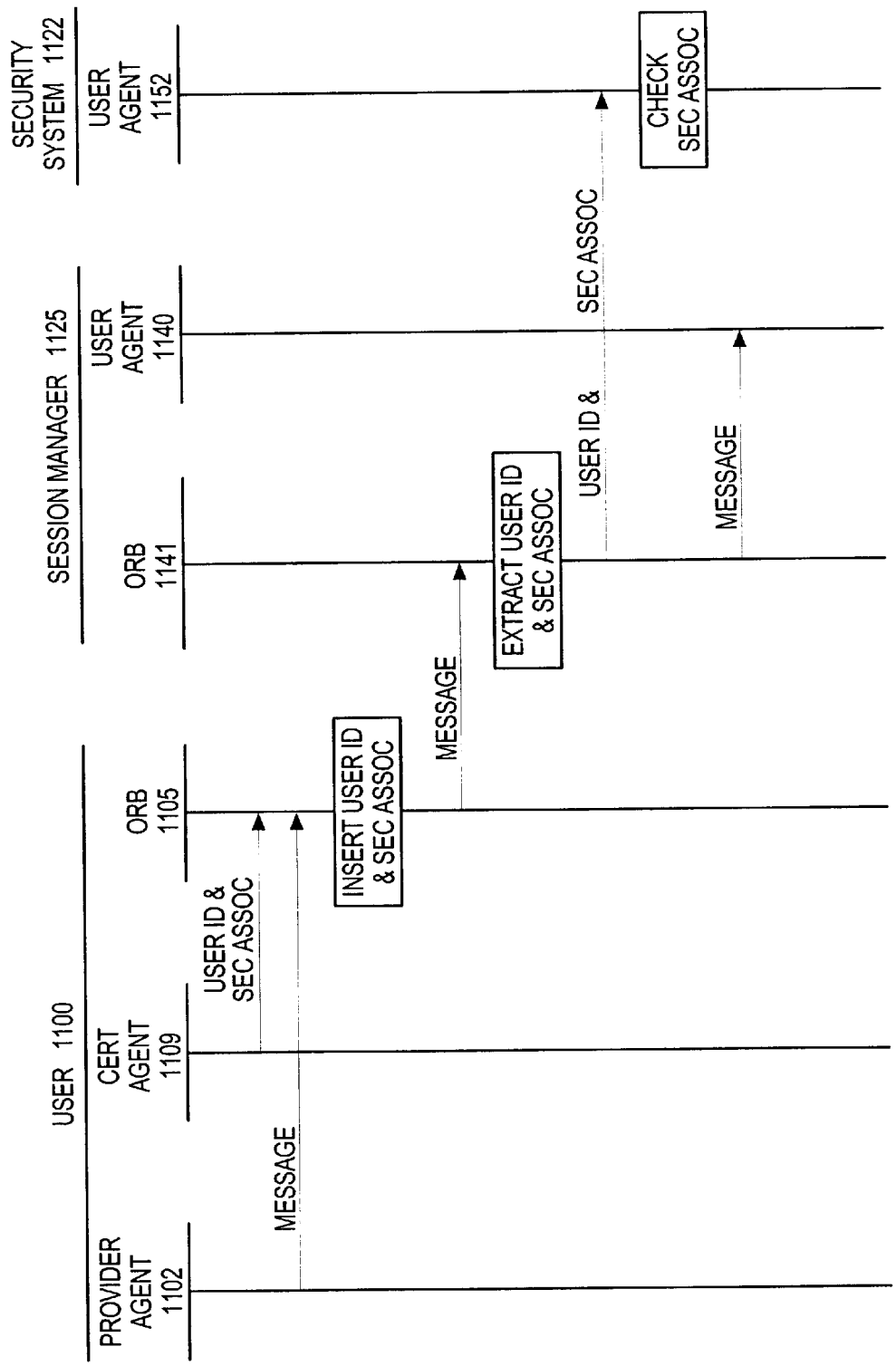
FIG. 24 is a process diagram of communications system operation in an example of the invention.
Figure 25:
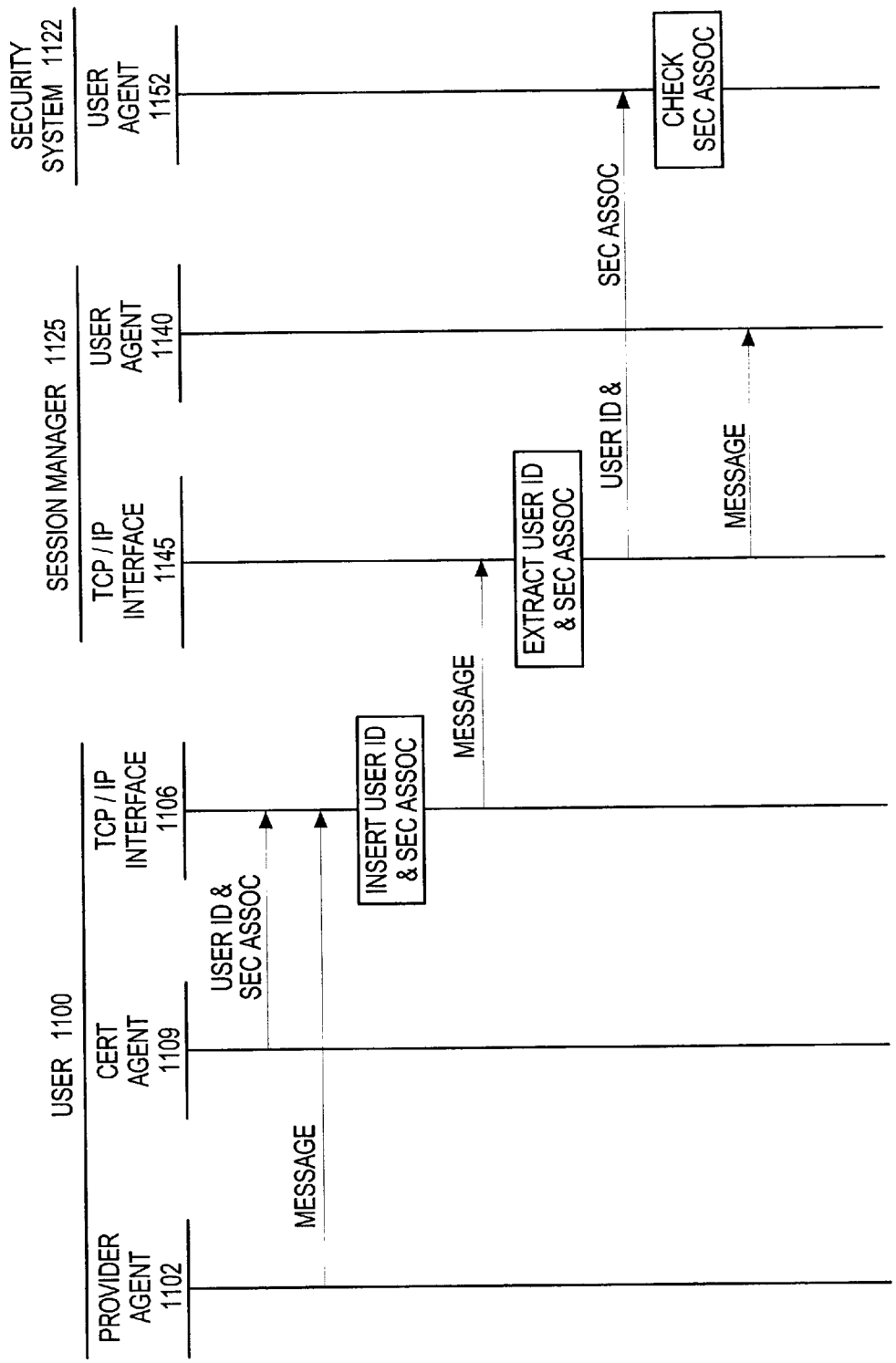
FIG. 25 is a process diagram of communications system operation in an example of the invention.

Communications System Security Operation—FIGS. 23–25

FIG. 23 illustrates process authentication for the provider agent 1102 in the user 1100. Other processes, such as the user agent 1140 in the session manager 1125 and the provider agent 1172 in the service 1170, would be authenticated in a similar manner.

The provider agent 1102 logs-in to the certification agent 1109 by providing its user ID and password. This certification agent 1109 instructs the crypto agent 1108 to generate an authentication file. The crypto agent 1108 generates the authentication file. The authentication file includes the user ID, a random number, a random number digest, a date/time stamp, and a digital signature. The random number is typically 40 bytes long. The random number digest is generated by passing the random number through a one-way hash function, such as the MD-5 algorithm, and then by passing the hash function result through a mask to obtain a 16 byte value. The digital signature is created by first using the password to decrypt the private key, and then by encrypting the random number digest with the private key.

The certification agent 1109 logs-in to the security system 1122 by providing the authentication file to the authenticator 1151. The authenticator 1151 instructs the certificate authority 1150 to verify the certificate for the user ID that is listed in the authentication file. The certificate authority 1150 requests the certificate for the user ID from the object database 1159, and the object database 1159 provides the certificate to the certificate authority 1150. The certificate authority 1150 verifies the certificate and forwards it to the authenticator 1151.

The authenticator 1151 generates a security association as follows. The random number from the authentication file is re-digested with the same one-way hash function as that used by the crypto agent 1108. The re-calculated digest is then compared to the digest from the authentication file for a match. If no match occurs, authentication fails and an alarm is sent to security system 1122 administration. The public key from the certificate is then used to decrypt the digital signature. The decrypted digital signature should be the same random number as the digest received in the authentication information and the digest re-calculated by the authenticator 1151. If the digital signature does not match, authentication fails and an alarm is sent to security system 1122 administration.

If the random number digests all match, then the authenticator 1151 generates a security association for the user ID. The security association is a random number that the security system 1122 uses to authenticate messages from the user ID during the subsequent communications session. The authenticator 1151 transfers the security association to the user agent 1152. The authenticator 1151 encrypts the security association with its own private key and sends the encrypted security association to the certification agent 1109. The certification agent 1109 passes the encrypted security association to the crypto agent 1108. The crypto agent 1108 uses the public key of the authenticator 1151 to decrypt the security association and return it to the certification agent 1109.

FIG. 24 illustrates message authentication at the ORB level for the provider agent 1102 in the user 1100. Other processes, such as the user agent 1140 in the session manager 1125 and the provider agent 1172 in the service 1170, would have messages authenticated in a similar manner.

At the user 1100, The certification agent 1109 transfers the user ID and security association to the ORB 1105 for subsequent insertion in messages from the provider agent 1102. The provider agent 1102 subsequently transfers a message to the ORB 1105 for delivery to the user agent 1140 in the session manager 1125. One of the interceptors 1179 or 1180 in the ORB 1105 inserts the user ID and security association in the security context of the CORBA wrapper for the message. The ORB 1105 then transfers the message to the ORB 1141 in the session manager 1125. This transfer occurs through the TCP/IP interfaces 1106 and 1145 (not shown).

At the session manager 1125, one of the interceptors 1142 or 1144 in the ORB 1140 extracts the user ID and security association from the security context in the message. The ORB 1140 then forwards the user ID and security association to the user agent 1152 in the security system 1122 for message authentication.

The user agent 1152 checks the security association from the ORB 1140 with the security association previously received from the authenticator 1151 for the user ID. If IS the security associations do not match, then the user agent 1152 sends an alarm to the security system 1122 administration. If desired, the user agent 1152 could transfer message back to the ORB 1141 blocking communications from that user ID. If the message is authentic, the orb 1141 transfers the message to the user agent 1140.

FIG. 25 illustrates message authentication at the TCP/IP level for the provider agent 1102 in the user 1100. Other processes, such as the user agent 1140 in the session manager 1125 and the provider agent 1172 in the service 1170, would have messages authenticated in a similar manner.

At the user 1100, the certification agent 1109 transfers the user ID and security association to the TCP/IP interface 1106 for subsequent insertion in messages from the provider agent 1102. The provider agent 1102 subsequently transfers a message through the ORB 1105 (not shown) to the TCP/IP interface 1106 for delivery to the user agent 1140 in the session manager 1125. The TCP/IP interface 1106 inserts the user ID and security association in the TCP/IP message envelope. The TCP/IP interface 1106 then transfers the message to the TCP/IP interface 1145 in the session manager 1125.

At the session manager 1125, the TCP/IP interface 1145 extracts the user ID and security association from the TCP/IP message envelope. The TCP/IP interface 1145 then forwards the user ID and security association to the user agent 1152 in the security system 1122 for message authentication.

The user agent 1152 checks the security association from the TCP/IP interface 1145 with the security association previously received from the authenticator 1151 for the user ID. If the security associations do not match, then the user agent 1152 sends an alarm to the security system 1122 administration. If desired, the user agent 1152 could transfer message back to the TCP/IP interface 1145 blocking communications from that user ID. If the message is authentic, the TCP/IP interface 1145 transfers the message to the user agent 1140 through the ORB 1141 (not shown).

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A software product for secure communications using a computer system, the software product comprising:

message interface software configured to direct the computer system to transfer messages between Graphical User Interface (GUI) software and security software and between the GUI software and transport software, to provide the GUI software with language-neutral method calls to the security software, to insert first security associations into the messages transferred from the computer system, to extract second security associations from the messages received by the computer system, and to transfer the second security associations for authentication by a security system; and a storage media that stores the message interface software.

2. The software product of claim 1 wherein the message interface software is configured to direct the computer system to store information indicating ports, Internet addresses, and object identifiers for software objects.

3. The software product of claim 1 wherein the message interface software is configured to direct the computer system to implement an Interface Description Language (IDL).

4. The software product of claim 1 wherein the message interface software is configured to direct the computer system to implement Microsoft DCOM.

5. The software product of claim 1 wherein a portion of the messages are CORBA exception messages.

6. The software product of claim 1 further comprising the transport software configured to direct the computer system to transfer the messages between the message interface software and a communication network, to insert the first security associations into the messages transferred from computer system, and to extract the second security associations from the messages received by the computer system, and transfer the second security associations for authentication by a security system, and wherein the storage media stores the transport software.

7. The software product of claim 6 wherein the message interface software is configured to direct the computer system to insert a first portion of the first security associations into the messages transferred from the computer system, and wherein the transport software is configured to direct the computer system to insert a second portion of the first security associations into the messages transferred from computer system.

8. The software product of claim 6 wherein the GUI software is configured to direct the computer system to provide Internet access and the transport software is configured to direct the computer system to implement an Internet Protocol.

9. The software product of claim 1 further comprising the security software configured to direct the computer system to receive a password from the GUI software through the message interface, decrypt a private key with the password, encrypt a result with the private key, and transfer the encrypted result for authentication by the security system, and wherein the storage media stores the security software.

10. The software product of claim 1 wherein the GUI software is configured to direct the computer system to provide an employee with access to an employer communication network over the Internet.

11. The software product of claim 1 wherein the GUI software is configured to direct the computer system to provide a customer with access to a service over the Internet.

12. The software product of claim 1 wherein the GUI software is configured to direct the computer system to provide a network customer with access to a communication network manager over the Internet.

13. A method of operating a computer system for secure communications, the method comprising:
    transferring messages through a message interface between a Graphical User Interface (GUI) and a security process and between the GUI and a transport interface;
    in the message interface, providing the GUI software with language-neutral method calls to the security software;
    in the message interface, inserting first security associations into the messages transferred from the computer system;
    in the message interface, extracting second security associations from the messages received by the computer system; and
    transferring the second security associations from the message interface for authentication by a security system.

14. The method of claim 13 wherein providing the GUI with the language-neutral method calls to the security process comprises storing information indicating ports, Internet addresses, and object identifiers for software objects.

15. The method of claim 13 wherein providing the GUI with the language-neutral method calls to the security process comprises implementing an Interface Description Language (IDL).

16. The method of claim 13 wherein providing the GUI with the language-neutral method calls to the security process comprises implementing Microsoft DCOM.

17. The method of claim 13 wherein a portion of the messages are CORBA exception messages.

18. The method of claim 13 further comprising:
    transferring the messages through the transport interface between the message interface and a communication network;
    in the transport interface, inserting the first security associations into the messages transferred from computer system;
    in the transport interface, extracting the second security associations from the messages received by the computer system; and
    transferring the second security associations from the transport interface for authentication by a security system.

19. The method of claim 18 wherein inserting the first security associations into the messages transferred from the computer system comprises:
    in the message interface, inserting a first portion of the first security associations into the messages transferred from the computer system; and
    in the transport interface, inserting a second portion of the first security associations into the messages transferred from computer system.

20. The method of claim 18 wherein transferring the messages through the message interface and the transport interface between the GUI and the communication network comprises providing Internet access using an Internet Protocol.

21. The method of claim 13 further comprising:
    in the security process, receiving a password from the GUI through the message interface;
    in the security process, decrypting a private key with the password;
    in the security process, encrypting a result with the private key; and
    transferring the encrypted result from the security process for authentication by the security system.

22. The method of claim 13 wherein the GUI is configured to provide an employee with access to an employer communication network over the Internet.

23. The method of claim 13 wherein the GUI is configured to provide a customer with access to a service over the Internet.

24. The method of claim 13 wherein the GUI is configured to provide a network customer with access to a communication network manager over the Internet.

25. A communication system comprising:
    a session manager configured to exchange network control messages with user systems, process the network control messages to control communication services for the user systems, insert first security associations in two different layers of the network control messages transferred to the user systems, extract second security associations from the two different layers of the network control messages received from the user systems; and a security system configured to exchange security messages with the user systems to authenticate the user systems, and to process the second security associations to authenticate the network control messages received from the user systems.

26. The communication system of claim 25 wherein one of the layers comprises a network transport layer.

27. The communication system of claim 25 wherein one of the layers comprises a language-neutral message interface layer.

28. The communication system of claim 25 wherein one of the layers comprises an Internet Protocol layer.

29. The communication system of claim 25 wherein one of the layers comprises a Microsoft DCOM layer.

30. The communication system of claim 25 wherein one of the layers comprises a CORBA layer.

31. The communication system of claim 25 wherein the security system is configured to generate the first security associations and the second security associations.

32. A method of operating a communication system, the method comprising:

exchanging security messages with user systems to authenticate the user systems;

exchanging network control messages with user systems and processing the network control messages to control communication services for the user systems;

inserting first security associations in two different layers of the network control messages transferred to the user systems;

extracting second security associations from the two different layers of the network control messages received from the user systems; and processing the second security associations to authenticate the network control messages received from the user systems.

33. The method of claim 32 wherein one of the layers comprises a network transport layer.

34. The method of claim 32 wherein one of the layers comprises a language-neutral message interface layer.

35. The method of claim 32 wherein one of the layers comprises an Internet Protocol layer.

36. The method of claim 32 wherein one of the layers comprises a Microsoft DCOM layer.

37. The method of claim 32 wherein one of the layers comprises a CORBA layer.

38. The method of claim 32 further comprising generating the first security associations and the second security associations.

* * * * *